United States Patent
Hsu et al.

(10) Patent No.: US 8,218,695 B2
(45) Date of Patent: Jul. 10, 2012

(54) WIRELESS TRANSMISSION SYSTEM, RECEIVER THEREOF, AND METHOD FOR REMOVING INTER-CARRIER INTERFERENCE THEREOF

(75) Inventors: Jen-Yuan Hsu, Kinmen County (TW); Lai-Huei Wang, Taoyuan County (TW); Jiun-Yo Lai, Taichung (TW); Pang-An Ting, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 935 days.

(21) Appl. No.: 12/243,090

(22) Filed: Oct. 1, 2008

(65) Prior Publication Data

US 2009/0180559 A1    Jul. 16, 2009

(30) Foreign Application Priority Data

Jan. 15, 2008  (TW) ................ 97101557 A
Apr. 3, 2008   (TW) ................ 97112353 A

(51) Int. Cl.
*H03D 1/04* (2006.01)
*H03K 9/00* (2006.01)
(52) U.S. Cl. ............ 375/346; 375/316
(58) Field of Classification Search ............ 375/260, 375/259, 346, 316
See application file for complete search history.

(56) References Cited

U.S. PATENT DOCUMENTS 8,000,417 B1 *  8/2011  Zhidkov et al. ............ 375/346
2007/0211786 A1 * 9/2007  Shattil .................... 375/141

FOREIGN PATENT DOCUMENTS

WO  WO 2006057195 A1 *  6/2006

OTHER PUBLICATIONS

European Search Report dated Apr. 5, 2012.
Li, Z., et al.; "Analysis of a New Scheme Mitigating the Impact of Inter-Carrier Interference on OFDM Communication Systems;" Wireless Communications, Networking and Mobile Computing; 2006; pp. 1-4.
Zhao, L., et al.; "A New ICI Self-Cancellation Scheme Based on Repeated Symbol in OFDM Systems;" IEEE; 2006; pp. 1216-1220.

* cited by examiner

*Primary Examiner* — David C. Payne
*Assistant Examiner* — Brian J Stevens
(74) *Attorney, Agent, or Firm* — Thomas|Kayden

(57) ABSTRACT

A method for removing ICI for a received symbol is provided. Firstly, a transmitted symbol is received via a wireless channel within a symbol time so as to obtain the received symbol. The transmitted symbol includes P identical original partial data, wherein P is a positive integer larger than 1. The received symbol includes P received partial data corresponding to the original partial data, respectively. Next, on a time domain at least two of the P received partial data are copied so as to obtain at least two copied partial data. Each copied partial data includes P copies of its corresponding received partial data. After that, an estimated ICI of the time domain is determined according to the product of a predetermined constant array and the difference between the copied partial data. Afterwards, the estimated ICI is subtracted from the received symbol so as to obtain an output symbol.

41 Claims, 12 Drawing Sheets

US 8,218,695 B2

WIRELESS TRANSMISSION SYSTEM, RECEIVER THEREOF, AND METHOD FOR REMOVING INTER-CARRIER INTERFERENCE THEREOF

This application claims the benefits of Taiwan application Serial No. 97101557 filed Jan. 15, 2008 and Taiwan application Serial No. 97112353 filed Apr. 3, 2008, the subject matter of which is incorporated herein by reference.

BACKGROUND OF THE INVENTION

1. Field of the Invention

The invention relates in general to a method for estimating and removing inter-carrier interference (ICI), and more particularly to a lowly complicated method for estimating and removing ICI on a time domain.

2. Description of the Related Art

In recent years, orthogonal frequency division multiplexing (OFDM) communication technology has been widely used in communication system. In order to transmit data under wireless channel environment, the symbol time is prolonged, and a cyclic prefix (CP) is added to resolve the multipath delay spread of wireless channel. However, when the symbol time is longer, the system becomes very sensitive to carrier frequency deviation. In a moving environment, the wireless channel environment is time-variant. When the speed is too high, the wireless channel becomes not fixed within a symbol time. Furthermore, the time-variant channel will damage symbol orthogonality, generate Doppler spread in frequency domain and incur inter-carrier interference (ICI) at the receiving end.

Many methods for removing ICI have been provided to resolve the above ICI problem. These methods are mainly divided into two categories. The category I methods remove ICI for a symbol in two stages. Stage I is mainly for estimating the time-variant channel, and stage II is for removing the interference. By means of specially designed time domain pilot signals or frequency domain pilot signals, the time-variant channel is estimated, the carrier value is detected, and the interference is removed according to a linear or a non-linear symbol detecting method.

The other category is called 'inter-carrier interference self-cancellation scheme'. According to the inter-carrier interference self-cancellation scheme, the transmitting end modulates the to-be-transmitted original carrier to a plurality of adjacent and alternated carriers with opposite polarities. Each original carrier is mapped to a group of polar and anti-polar carriers. During reception, each polar carrier and anti-polar carrier are respectively multiplied by a positive sign and a negative sign and combined, and then the inter-carrier interference will be self-cancelled. However, as each original carrier corresponds to a group of anti-polar carriers, the utilization efficiency of the frequency spectrum will deteriorate severely.

SUMMARY OF THE INVENTION

The invention is directed to a lowly complicated method for estimating and removing ICI on a time domain. As the symbol has repeated data, the method for removing ICI according to the embodiments of the invention effectively estimates and removes ICI for a received symbol by way of simple operation such as addition, subtraction and multiplication.

According to a first aspect of the present invention, a method for removing inter-carrier interference (ICI) for a received symbol is provided. Firstly, a transmitted symbol is received via a wireless channel within a symbol time so as to obtain the received symbol. The transmitted symbol includes P identical original partial data, wherein P is a positive integer larger than 1. The received symbol includes P received partial data corresponding to the original partial data, respectively. Next, on a time domain at least two of the P received partial data are copied so as to obtain at least two copied partial data. Each copied partial data includes P copies of its corresponding received partial data. After that, an estimated ICI of the time domain is determined according to the product of a predetermined constant array and the difference between the copied partial data. Afterwards, the estimated ICI is subtracted from the received symbol so as to obtain an output symbol According to a second aspect of the present invention, a receiver is provided for receiving a transmitted symbol generated by a transmitter via a wireless channel within a symbol time so as to obtain the received symbol and then remove ICI for the received symbol. The transmitted symbol includes P original partial data. Each original partial data includes a plurality of original time domain sampling data. Each original partial data is the same. The received symbol includes a plurality of received partial data corresponding to original partial data, respectively. The receiver includes a data synchronization module, an ICI estimating module, an ICI removing module, a fast Fourier transformer, and a demodulator. The data synchronization module synchronizes the received symbol. The ICI estimating module copies at least two of the P received partial data on a time domain so as to obtain at least two copied partial data. Each copied partial data includes P copies of its corresponding received partial data. P is a positive integer larger than 1. The ICI estimating module determines an estimated ICI according to the difference between the copied partial data and the product of a predetermined constant array. The ICI removing module subtracts the estimated ICI from the received symbol so as to obtain an output symbol. The Fast Fourier transformer converts the output symbol to a frequency domain. The demodulator demodulates the output symbol in the frequency domain.

According to a third aspect of the present invention, a wireless transmission system including a transmitter and a receiver is provided. The transmitter generates and transmits a transmitted symbol of a time domain. The transmitted symbol includes P original partial data, wherein P is a positive integer larger than 1. Each original partial data includes a plurality of original time domain sampling data. Each original received partial data is the same. The receiver receives the transmitted symbol via a wireless channel within a symbol time so as to obtain a received symbol. The received symbol includes P received partial data respectively corresponding to P original partial data. The receiver includes a data synchronization module, an ICI estimating module, an ICI removing module, a fast Fourier transformer, and a demodulator. The data synchronization module synchronizes the received symbol. The ICI estimating module copies at least two of the P received partial data on a time domain so as to obtain at least two copied partial data. Each copied partial data includes P copies of its corresponding received partial data. The ICI estimating module determines an estimated ICI according to the product of a predetermined constant array and the difference between the copied partial data. The ICI removing module subtracts the estimated ICI from the received symbol so as to obtain an output symbol. The fast Fourier transformer converts the output symbol into a frequency domain. The demodulator demodulates the output symbol in the frequency domain.

According to a fourth aspect of the present invention, a method for removing ICI for a received symbol is provided. This method includes the following steps. Firstly, a transmitted symbol generated by a transmitter is received via a wireless channel within a symbol time so as to obtain the received symbol. The transmitted symbol includes an original data symbol and a cyclic prefix (CP) data. The cyclic prefix data is the same with the rear-end data of the original data symbol. The received symbol includes a received data symbol and a received cyclic prefix data corresponding to the original data and the cyclic prefix data, respectively. A received rear-end data of the received data symbol corresponds to the rear-end data. Next, an estimated ICI is determined according to the product of a predetermined constant array and the difference between at least part of the received cyclic prefix data and at least part of the received rear-end data. After that, the estimated ICI is subtracted from the received symbol so as to obtain an output symbol.

According to a fifth aspect of the present invention, a wireless transmission system including a transmitter and a receiver is provided. The transmitter generates and transmits a transmitted symbol of a time domain. The transmitted symbol is a data which includes an original data symbol and a cyclic prefix data. The cyclic prefix data is the same with an original rear-end data of the original data symbol. The receiver receives the transmitted symbol via a wireless channel within a symbol time so as to obtain a received symbol. The received symbol correspondingly includes a received data symbol and a received cyclic prefix data corresponding to the original data and the cyclic prefix data, respectively. A received rear-end data of the received data symbol corresponds to the rear-end data. The receiver includes a data synchronization module, an ICI estimating module, an ICI removing module, a fast Fourier transformer, and a demodulator. The data synchronization module synchronizes the received symbol. The ICI estimating module determines an estimated ICI according to the product of a predetermined constant array and the difference between at least part of the received cyclic prefix data and at least part of the received rear-end data. The ICI removing module subtracts the estimated ICI from the received symbol so as to obtain an output symbol. The fast Fourier transformer converts the output symbol into a frequency domain. The demodulator demodulates the output symbol in the frequency domain.

According to a sixth aspect of the present invention, a method for removing ICI is provided. The method includes the following steps. Firstly, a transmitted symbol generated by a transmitter is received via a wireless channel within a symbol time so as to obtain the received symbol. The transmitted symbol includes at least two identical original partial data. The received symbol includes at least two corresponding received partial data corresponding to the two original partial data, respectively. After that, an estimated IC is determined according to the product of a predetermined constant array and the difference between at least two received partial data. Next, the estimated ICI is subtracted from the received symbol so as to obtain an output symbol.

The invention will become apparent from the following detailed description of the preferred but non-limiting embodiments. The following description is made with reference to the accompanying drawings.

DETAILED DESCRIPTION OF THE INVENTION

Figure 1:
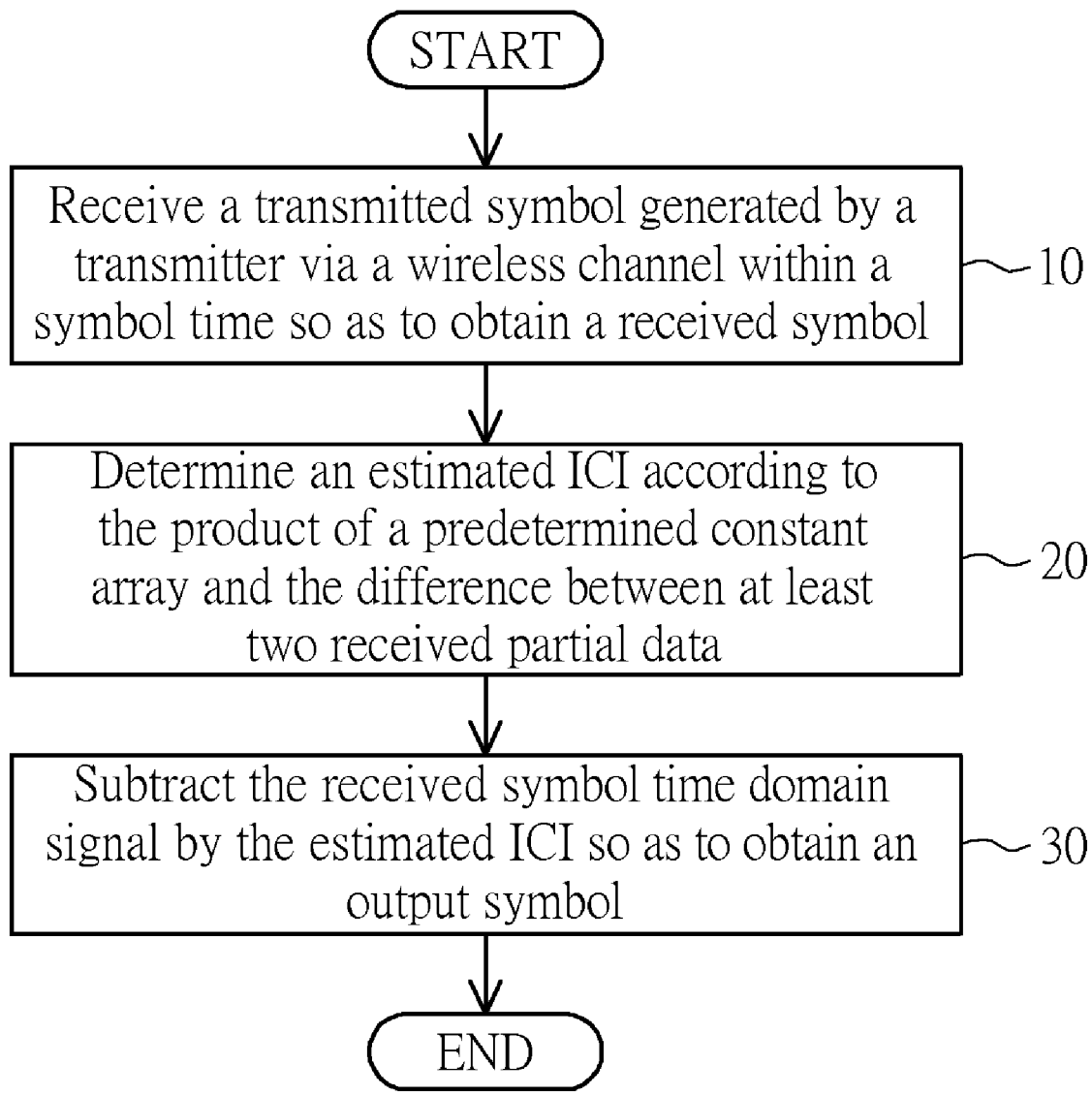
FIG. 1 shows a flowchart of a method for removing ICI according to the an embodiment of the invention.

According to the method for removing inter-carrier interference (ICI) disclosed in the following embodiments of the invention, the ICI is estimated according to the feature that the repeated data in a transmitted symbol time domain generate different responses when passing through a time-variant channel. FIG. 1 shows a flowchart of a method for removing ICI according to the embodiment of the invention. Firstly, the method beginning at step 10, a transmitted symbol generated by a transmitter is received via a wireless channel within a symbol time so as to obtain a received symbol. The data generated by the transmitter includes at least two repeated original partial data on a time domain. During reception, the response after the data passes through the time-variant channel is retrieved so as to obtain the received symbol. The received symbol includes at least two corresponding received partial data corresponding to the two repeated original partial data, respectively. Next, the method proceeds to step 20, an estimated ICI is determined according to the product of a predetermined constant array and the difference between at least two received partial data. After that, the method proceeds to step 30, the received time domain symbol is subtracted by the estimated ICI so as to obtain an output symbol free of ICI.

Figure 2:
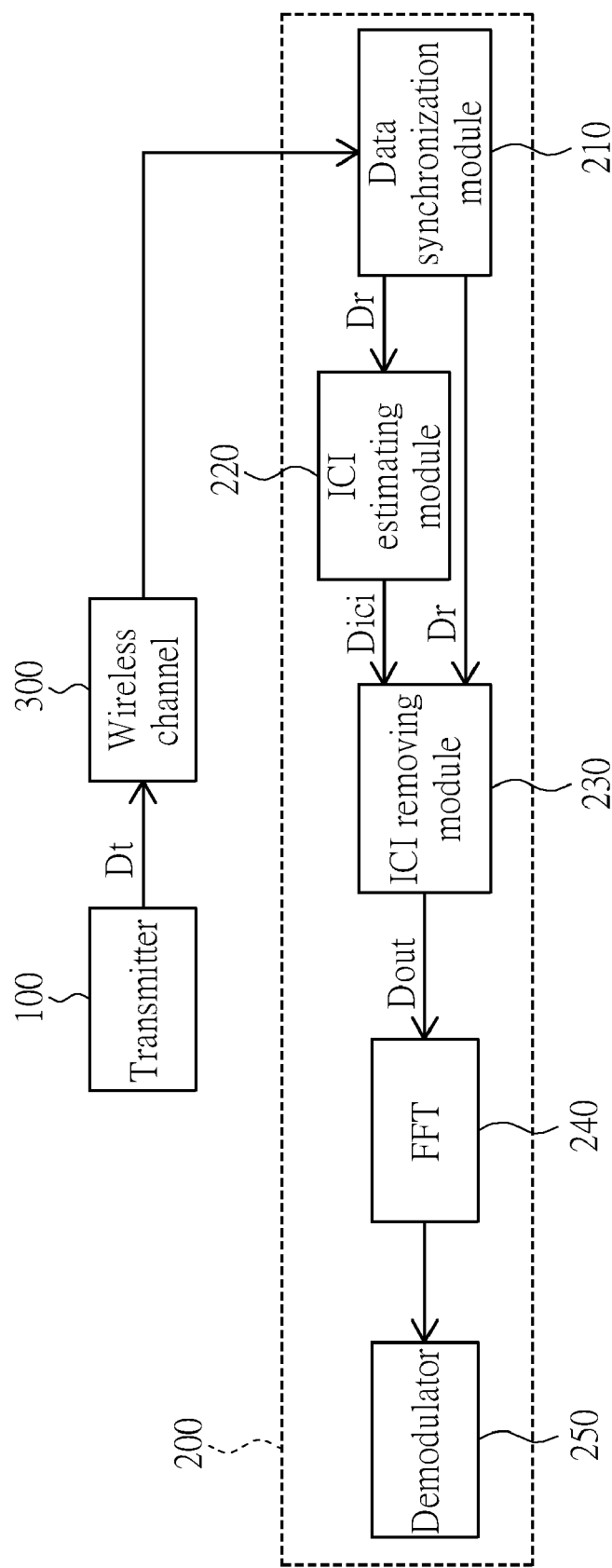
FIG. 2 shows a block diagram of a wireless transmission system according to the an embodiment of the invention.

FIG. 2 shows a block diagram of a wireless transmission system according to the embodiment of the invention. As indicated in FIG. 2, the wireless transmission system of an embodiment of the invention includes a transmitter 100 and a receiver 200. The transmitter 100 generates and transmits a transmitted symbol Dt. The transmitted symbol Dt generated by the transmitter 100 includes at least two repeated original partial data Dprt on the time domain.

The receiver 200 includes a data synchronization module 210, an ICI estimating module 220, an ICI removing module 230, a fast Fourier transformer (FFT) 240 and a demodulator 250. The receiver 200 performs the method for removing ICI of FIG. 1. The operations of the transmitter and the receiver of FIG. 2 are elaborated in two embodiments according to different types of data repetition in a transmitted symbol. In the following two embodiments, the transmitter and the receiver of FIG. 2 are used in orthogonal frequency division multiplexing (OFDM) communication technology.

First Embodiment

In the first embodiment, the transmitted symbol Dt generated by the transmitter 100 includes N time domain sampling data. The N original time domain sampling data are divided into P repeated original partial data Dprt, wherein P is a positive integer larger than 1. Each original partial data Dprt includes $$\frac{N}{P}$$

original time domain sampling data. That is, the transmitted symbol has P repeated data. The receiver 200 receives the transmitted symbol Dt via a wireless channel 300 so as to obtain a received symbol. The received symbol is processed by a data synchronization module 210 to obtain a synchronous received symbol Dr. The received symbol Dr includes N received time domain sampling data which are divided into P received partial data Dprt' corresponding to P original partial data Dprt of the transmitted symbol Dt, respectively.

Figure 3:
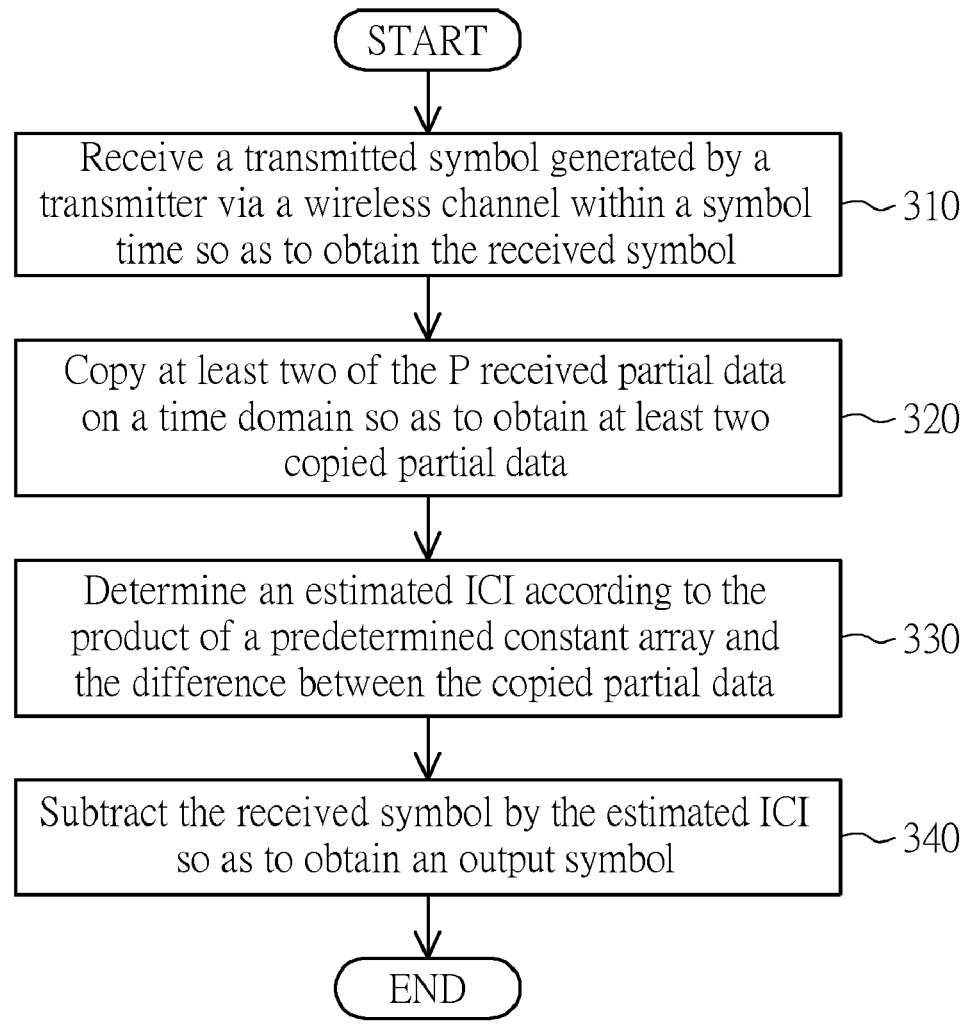
FIG. 3 shows a flowchart of a method for removing ICI according to a first embodiment.

FIG. 3 shows a flowchart of a method for removing ICI according to a first embodiment. The method for removing ICI according to the first embodiment is used in the receiver 200. Also, referring to FIG. 2 and FIG. 3. In step 310, the data synchronization module 210 receives a transmitted symbol Dt via a wireless channel within a symbol time 300 so as to obtain a received symbol Dr. The data synchronization module 210 synchronizes the received symbol Dr with respect to both time and frequency, and then outputs the synchronized received symbol Dr.

Next, the method proceeds to step 320, the ICI estimating module 220 retrieves P received partial data Dprt' and at least two partial data Dprt' from a time domain and performs time domain copying to different partial data Dprt' respectively so as to obtain at least two copied partial data Dcpy. Each copied received partial data Dcpy includes P copies of its corresponding received partial data Dprt'.

Then, the method proceeds to step 330, the ICI estimating module 220 determines an estimated ICI Dici according to the product of a predetermined constant array and the difference between at least two copied partial data Dcpy.

After that, the method proceeds to step 340, the ICI removing module 230 subtracts the received symbol Dr by the estimated ICI Dici so as to obtain an output symbol Dout free of ICI.

After removing the estimated ICI Dici, the FFT 240 converts the output symbol Dout into a frequency domain. The demodulator 250 demodulates the output symbol in the frequency domain.

In step 320, in order to copy the received partial data Dprt', the ICI estimating module 220 multiplies the received symbol Dr by at least two of P window matrixes, respectively, and a copied partial data Dcpy(i) is generated if the received symbol Dr is multiplied by the i-th window matrix $W_i$. The copied partial data Dcpy(i) includes P copies of the i-th received partial data Dprt'(i), wherein i is a positive integer smaller than or equal to P. Each window matrix is N×N and includes P unit matrixes being $$\frac{N}{P} \times \frac{N}{P}$$

each. In the i-th window matrix $W_i$, the first column of each unit matrix is located in the $$\left((i-1) \times \frac{N}{P} + 1\right)\text{-}th$$

column of the i-th window matrix, and all other entries are 0. The copying operation is stated below.

Figure 4:
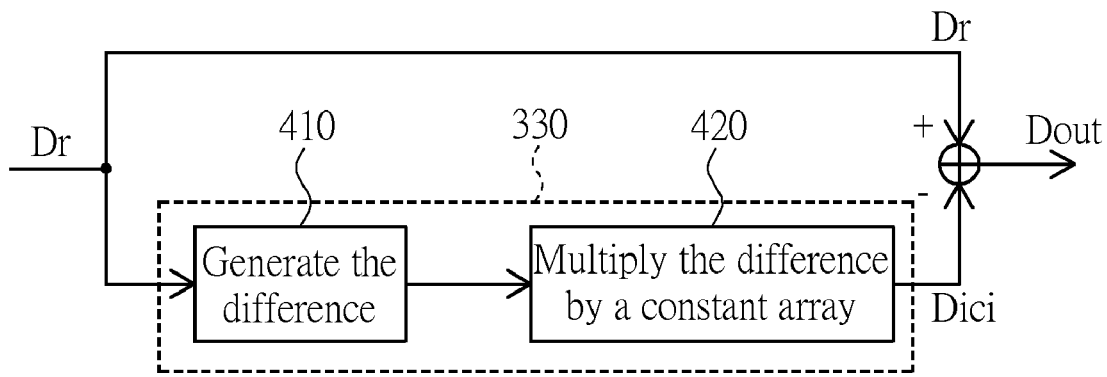
FIG. 4 shows a detailed perspective of step 330 and step 340 of FIG. 3.

FIG. 4 shows a detailed perspective of step 330 and step 340 of FIG. 3. Referring to FIG. 3 and FIG. 4. Step 330 includes two sub-steps 410 and 420. In step 410, the ICI estimating module 220 generates the difference between at least two copied partial data Dcpy. Next, in the sub-step 420, the ICI estimating module 220 multiplies the above difference by a constant array so as to obtain an estimated ICI Dici. The constant array is a diagonal sequence of a diagonal matrix C. For example, C is an N×N matrix whose entry in the i-th row and the j-th column is expressed as:

$$C(i, j) = \begin{cases} \frac{P}{(P-a) \times N}\left(i - \frac{N-1}{2}\right) & i = j \\ 0 & \text{else,} \end{cases} \quad \text{formula 1}$$

wherein i and j are positive integers smaller than or equal to N, and a is a positive integer smaller than P.

The theories for step 320 to step 350 are stated below. Firstly, the system model used in the method for removing ICI of the present embodiment of the invention is elaborated. Formula 2 states the relationship between the transmitted symbol Dt generated by the transmitter 100 and the received symbol Dr synchronized by the synchronization module 210 after the transmitted symbol Dt passes through the wireless channel 300. The relationship is expressed as:

$$y_i = \sum_{k=0}^{L-1} h_k^{(i)} x_{((i-k))_N} + n_i, \ 0 \le i \le N-1, \quad \text{formula 2}$$

wherein N is the number of carriers; L is the number of effective paths of the wireless channel 300; $y_i$ is the i-th received time domain sampling data of the N received time domain sampling data of the received symbol Dr; $x_{i-k}$ is the (i–k)-th original time domain sampling data of the transmitted symbol Dt generated by the transmitter 100; $h_k^{(i)}$ is the time domain channel response of the k-th path of the wireless channel 300 at the i-th time point; $n_i$ is the additive white Gaussian noise (AWGN) at the i-th time point.

Formula 3 is the matrix form of formula 2 and is expressed as:

$$\vec{y} = H\vec{x} + \vec{n} \quad \text{formula 3,}$$

wherein $\vec{y}$, the received symbol Dr, is an N×1 matrix whose i-th entry is $y_i$ of formula 2; $\vec{x}$, an array of the transmitted symbol Dt of the transmitter 100, is an N×1 matrix whose i-th row entry is the $x_i$ of formula 2; $\vec{n}$, a Gaussian noise array, is an N×1 matrix whose i-th row entry is $n_i$ of formula 2; H is a time response matrix of the wireless channel 300; the entry in the i-th row and the j-th column, H(i, j), is $h_{((i-j))_N}^{(i)}$ of formula 2.

Figure 5A:
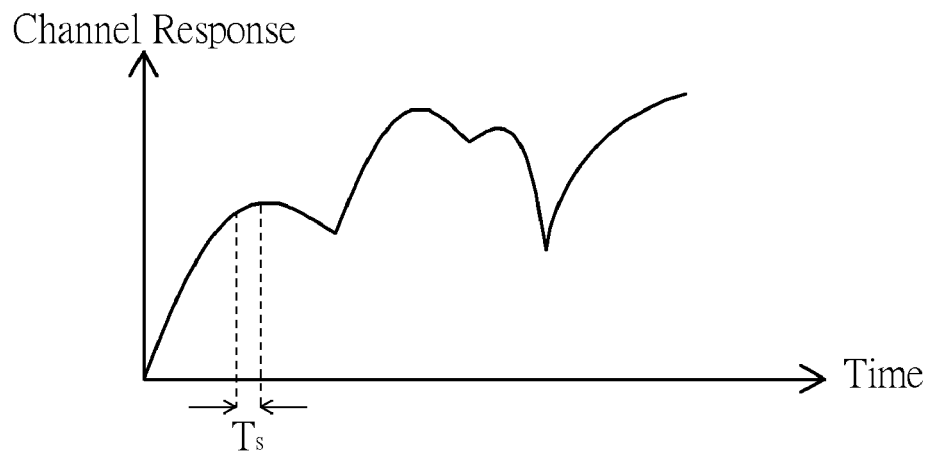
FIG. 5A shows an example of the change in the channel response of a transmitted symbol during transmission within a symbol time according to the first embodiment.
Figure 5B:
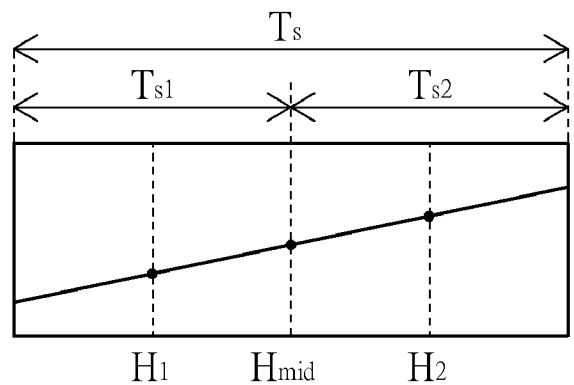
FIG. 5B shows a perspective of a linear approximation of the channel response of FIG. 5A.

FIG. 5A shows an example of the change in the channel response of a transmitted symbol during transmission within a symbol time according to the first embodiment. If the receiver 200 is not moving fast, as indicated in FIG. 5B, the change in the channel response within a symbol time $T_s$ can be denoted by linear approximation.

Thus, the channel response on the k-th path at the i-th time is approximated as formula 4:

$$h_k^{(i)} \approx h_k^{(\frac{N-1}{2})} + \left(\left(i - \frac{N-1}{2}\right)/(N-1)\right) \cdot \alpha_k, \quad \text{formula 4}$$

wherein $\alpha_k$, the change of the k-th path from the beginning to the end of the symbol time $T_s$, is expressed as:

$$\alpha_k = h_k^{(N-1)} - h_k^{(0)} \quad \text{formula 5.}$$

By applying formula 4 and formula 5 to formula 3, a new formula is obtained as:

$$\vec{y} \approx H_{mid}\vec{x} + M \times A \times \vec{x} + \vec{n} \quad \text{formula 6,}$$

wherein $$H_{mid}(i,j) = h_{((i-j))_N}^{(\frac{N-1}{2})} \ 0 \le i, j \le N-1 \quad \text{formula 7}$$

$$A(i,j) = \alpha_{((i-j))_N} \ 0 \le i, j \le N-1 \quad \text{formula 8}$$

$$M(i,j) = \begin{cases} \left(i - \frac{N-1}{2}\right)/(N-1), & i = j \\ 0, & \text{else.} \end{cases} \quad \text{formula 9}$$

The second item at the right-hand side of the equation of formula 6 is exactly the time domain ICI Dici to be estimated and removed, and is expressed as:

$$\vec{e}_{ici} \approx M \times A \times \vec{x} \quad \text{formula 10.}$$

According to formula 8, the higher the moving speed, the larger the change in the channel response $\alpha_k$. Thus, the larger the value of matrix A, the larger the ICI $\vec{e}_{ici}$ of formula 10.

The first item at the right-hand side of the equation of formula 6, that is, $H_{mid}$, is regarded as the approximated average channel response within the symbol time $T_s$, that is, the channel response at the middle point of the symbol time $T_s$ of FIG. 5B. $H_{mid}\vec{x}$ is the part not affected by ICI within the symbol time $T_s$.

Following the elaboration of the system model, steps 320 to 340 are elaborated in an example where the transmitted symbol Dt generated by the transmitter 100 includes two repeated original partial data Dprt, that is, P is exemplified as 2.

When $\vec{e}_{ici}$ is approximately linear within the symbol time $T_s$, $\alpha_k$ can be expressed as:

$$\alpha_k = h_k^{(N-1)} - h_k^{(0)} \quad \text{formula 11}$$

$$= \left(h_k^{(\frac{N-1}{4})} - h_k^{(\frac{3N-3}{4})}\right) \times \frac{2(N-1)}{N},$$

wherein $$h_k^{(\frac{N-1}{4})}$$

is the channel response on the k-th path at time point $$\frac{N-1}{4}$$

(that is, the average channel response within the first half of symbol time $T_{s1}$) and $$h_k^{(\frac{3N-3}{4})}$$

is the channel response on the k-th path at time point $$\frac{3N-3}{4}$$

that is, the average channel response within the second half of symbol time $T_{s2}$).

By applying formula 11 to formula 10, a new equation is obtained as follows:

$$\vec{e}_{ici} \approx \frac{2(N-1)}{N} \times M \times (H_2 - H_1) \times \vec{x}, \quad \text{formula 12}$$

wherein $$H_2(i,j) = h_{((i-j))_N}^{(\frac{3N-3}{4})}, \ 0 \le i, j \le N-1 \quad \text{formula 13}$$

$$H_1(i,j) = h_{((i-j))_N}^{(\frac{N-1}{4})}, \ 0 \le i, j \le N-1. \quad \text{formula 14}$$

As indicated in FIG. 5B, formula 12 estimates ICI according to the average channel response $H_1$ of the wireless channel

300 within the first half of symbol time $T_{s1}$ and the average channel response $H_2$ within the second half of symbol time $T_{s2}$. As indicated in formula 12, N and matrix M are known, the estimated ICI $\vec{e}_{ici}$ can be obtained if $(H_2-H_1) \times \vec{x}$ is known.

Like formula 4, the wireless channel response $h_k^{(i)}$ can be linearly approximated with $$h_k^{(\frac{N-1}{4})}$$

and $$h_k^{(\frac{3N-3}{4})}$$

being used as reference points respectively. Thus, the received symbol $\vec{y}$ can also be expressed as:

$$\vec{y} \approx H_2 \vec{x} + M_2 \times A \times \vec{x} + \vec{n} \qquad \text{formula 15}$$

$$\vec{y} \approx H_1 \vec{x} + M_1 \times A \times \vec{x} + \vec{n} \qquad \text{formula 16,}$$

wherein $$M_2(i,j) = \begin{cases} i - \left(\frac{3N-2}{4}\right)/(N-1) & i=j,\ 0 \le i,j \le N-1 \\ 0 & \text{else} \end{cases} \qquad \text{formula 17}$$

$$M_1(i,j) = \begin{cases} i - \left(\frac{N-2}{4}\right)/(N-1) & i=j,\ 0 \le i,j \le N-1 \\ 0 & \text{else.} \end{cases} \qquad \text{formula 18}$$

The relationship between the matrix $M_2$ of formula 17 and the matrix $M_1$ of formula 18 is expressed as:

$$M_1(i,i) = M_2\left(i + \frac{N}{2}, i + \frac{N}{2}\right). \qquad \text{formula 19}$$

In the present example, the transmitted symbol Dt has two identical original partial data Dprt(1) and Dprt(2), that is:

$$\vec{x} = \begin{bmatrix} \vec{x}_1 \\ \vec{x}_2 \end{bmatrix}. \qquad \text{formula 20}$$

In formula 20, $\vec{x}_1$ and $\vec{x}_2$ are respectively the first original partial data Dprt(1) and the second original partial data Dprt(2). In the present example, $\vec{x}_1 = \vec{x}_2$.

Thus, the method proceeds to step 320, the ICI estimating module 220 multiplies the received symbol Dr (that is, $\vec{y}$) by a first window matrix $W_1$ so as to obtain a first copied partial data Dcpy(1). This operation is expressed as:

$$\vec{y}_1 = W_1 \times \vec{y} = W_1 \times H_1 \times \vec{x} + W_1 \times M_1 \times A \times \vec{x} + W_1 \times \vec{n} \qquad \text{formula 21.}$$

In formula 21, $\vec{y}$ of formula 16 is multiplied by $W_1$. $\vec{y}_1$ includes two copies corresponding to the first received partial data Dprt'(1). $W_1$ is expressed as:

$$W_1 = \begin{bmatrix} I_{\frac{N}{2} \times \frac{N}{2}} & 0_{\frac{N}{2} \times \frac{N}{2}} \\ I_{\frac{N}{2} \times \frac{N}{2}} & 0_{\frac{N}{2} \times \frac{N}{2}} \end{bmatrix}. \qquad \text{formula 22}$$

In the present example, P is exemplified as 2, so $W_1$ is an N×N matrix which includes 2 unit matrixes $$I_{\frac{N}{2} \times \frac{N}{2}}$$

whose dimension is $$\frac{N}{2} \times \frac{N}{2}$$

and other entries are 0. In the first window matrix $W_1$ (that is, i=1), the first column of each unit matrix I is located in the first column (that is, the $$\left((1-1) \times \frac{N}{2} + 1\right)\text{-}th$$

column) of the window matrix $W_1$, and other entries are 0.

Figure 5C:
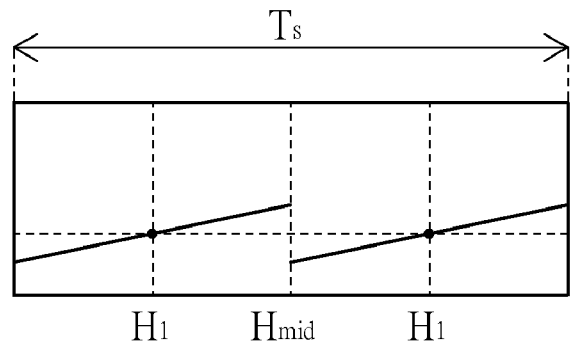
FIG. 5C shows a perspective of the channel response for a copied partial data corresponding to FIG. 5B.

FIG. 5C shows a perspective of the channel response for a copied partial data $\vec{y}_1$. In FIG. 5C, the average channel response received by two copies of the copied partial data $\vec{y}_1$ is $H_1$.

Similarly, the ICI estimating module 220 multiplies $\vec{y}$ by a second window matrix $W_2$ so as to obtain a second copied partial data Dcpy(2). The operation is expressed in formula 23:

$$\vec{y}_2 = W_2 \times \vec{y} = W_2 \times H_2 \times \vec{x} + W_2 \times M_2 \times A \times \vec{x} + W_2 \times \vec{n} \qquad \text{formula 23.}$$

In formula 23, the $\vec{y}$ of formula 15 is multiplied by $W_2$. $\vec{y}_2$ includes two copies corresponding to the second received partial data Dprt'(2):

$$W_2 = \begin{bmatrix} 0_{\frac{N}{2} \times \frac{N}{2}} & I_{\frac{N}{2} \times \frac{N}{2}} \\ 0_{\frac{N}{2} \times \frac{N}{2}} & I_{\frac{N}{2} \times \frac{N}{2}} \end{bmatrix}. \qquad \text{formula 24}$$

$W_2$ is an N×N matrix which also includes 2 unit matrixes $$I_{\frac{N}{2} \times \frac{N}{2}}$$

whose dimension is $$\frac{N}{2} \times \frac{N}{2}.$$

In the second window matrix $W_2$ (that is, i=2), the first column of each unit matrix $$I_{\frac{N}{2} \times \frac{N}{2}}$$

is located in the $$\left(\frac{N}{P}+1\right)$$

column (that is, the $$\left((2-1)\times\frac{N}{2}+1\right)\text{-}th$$

column) of the window matrix $W_2$, and other entries are 0.

Figure 5D:
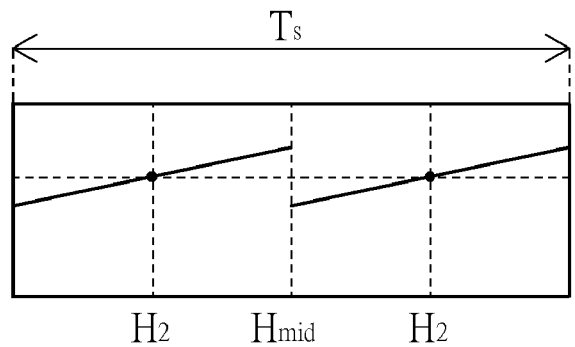
FIG. 5D shows a perspective of the channel response for another copied partial data corresponding to FIG. 5B.

Similarly, FIG. 5D shows a perspective of the channel response for another copied partial data $\vec{y}_2$. In FIG. 5D, the average channel response received by two copies of the copied partial data $\vec{y}_2$ is $H_2$.

According to formulas 19, 20, 22 and 24, it is concluded that in formula 21 and formula 23, $$W_1 \times M_1 \times A \times \vec{x} = W_2 \times M_2 \times A \times \vec{x} \quad \text{formula 25.}$$

Thus, when formula 23 is subtracted by formula 21, the result is expressed as:

$$\vec{y}_2 - \vec{y}_1 = (H_2 - H_1) \times \vec{x} + W_2 \times \vec{n} - W_1 \times \vec{n} \quad \text{formula 26.}$$

Let the Gaussian noise be excluded and neglected. As indicated in formula 26, the method proceeds to step 330, the ICI estimating module 220 subtracts the copied partial data Dcpy(2) (that is, $\vec{y}_2$) by the copied partial data Dcpy(1) (that is, $\vec{y}_1$) and the difference obtained is the item $(H_2-H_1) \times \vec{x}$ in formula 12.

In step 330, the ICI estimating module 220 further multiplies $(H_2-H_1) \times \vec{x}$ by a diagonal matrix C, and the estimated ICI $\vec{e}_{ici}$ of formula 12 is then obtained. The diagonal matrix C is obtained from formula 1 by setting P as 2 and setting a as 1:

$$C(i,j) = \begin{cases} \frac{P}{(P-a)\times N}\left(i-\frac{N-1}{2}\right) & i=j \\ 0 & \text{else} \end{cases} \quad \text{formula 27}$$

In step 340, the ICI removing module 230 subtracts the received symbol Dr (that is, $\vec{y}$) by the estimated ICI $\vec{e}_{ici}$ as to obtain an output symbol Dout free of the estimated ICI.

In the present example, step 320 to step 340 are exemplified by setting P as 2. However, the receiver and the method for removing ICI of the present embodiment of the invention are applicable to the transmitted symbol Dt having identical original partial data, that is, the transmitted symbol having repeated data. On the part of the transmitted symbol Dt having P identical original partial data, the copied partial data is obtained by copying the received partial data of the received symbol, and then the estimated ICI is obtained according to the product of a predetermined constant array and the difference between the copied partial data.

The preamble data of the symbol normally has the characteristics of data repetition. Therefore, the receiver 200 and the method for removing ICI of the present embodiment of the invention are applicable to the preamble data. Thus, with the ICI of the preamble data being effectively eliminated, the accuracy in the estimate of the channel of the preamble data is improved.

Figure 6A:
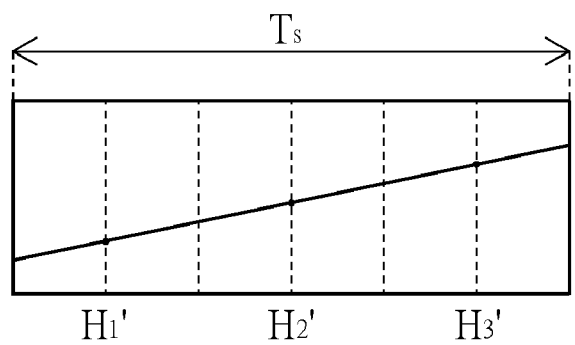
FIG. 6A shows another example of the change in the channel response within a symbol time according to the first embodiment.

The receiver and method for removing ICI of the present embodiment of the invention are further exemplified by another example below. FIG. 6A shows another example of the change in the channel response within a symbol time according to the first embodiment. Referring to FIG. 6A, when the transmitted symbol Dt has three identical original partial data (that is, P is exemplified as 3), the receiver 200 of the present embodiment of the invention divides the channel response within a symbol time $T_s$ into three parts corresponding to three identical original partial data, respectively. The three average channel responses $H_1'$, $H_2'$ and $H_3'$ are the average channel response of the wireless channel 300 in three partial time of the symbol time $T_s$, respectively. Furthermore, the received data received by the receiver 200 includes three received partial data corresponding to the three original partial data, respectively.

Similarly, the method proceeds to step 320, the ICI estimating module 220 respectively multiplies the received symbol $\vec{y}$ by at least two of the three window matrixes so as to obtain at least two copied partial data.

Figure 6B:
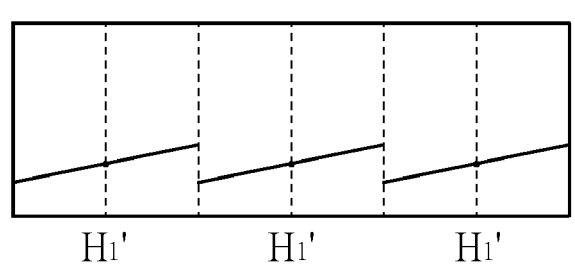
FIG. 6B shows a perspective of the channel response for a copied partial data corresponding to FIG. 6A.

For example, in step 320, the ICI estimating module 220 obtains two copied partial data $\vec{y}_1'$ and $\vec{y}_3'$. The copied partial data $\vec{y}_1'$ includes three copies of the first received partial data of the abovementioned three received symbol. FIG. 6B shows a perspective of the channel response for a copied partial data $\vec{y}_1'$, wherein the average channel response is $H_1'$.

Figure 6C:
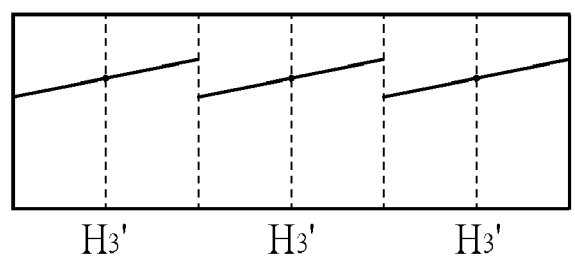
FIG. 6C shows a perspective of the channel response for another copied partial data corresponding to FIG. 6A.

Besides, the copied partial data $\vec{y}_3'$ includes three copies of the third received partial data of the abovementioned three received symbol. FIG. 6C shows a perspective of the channel response for a copied partial data $\vec{y}_3'$. In FIG. 6C, the average channel response is $H_3'$.

Next, the method proceeds to step 330, the ICI estimating module 220 obtain the estimated ICI $\vec{e}_{ici}'$ according to the diagonal matrix C' and the difference between the copied partial data $\vec{y}_1'$ and $\vec{y}_3'$ (that is, $(\vec{y}_3'-\vec{y}_1')$). The diagonal matrix C' is obtained from formula 1 by setting P as 3, and setting a as 1:

$$C'(i,j) = \begin{cases} \frac{3}{2\times N}\left(i-\frac{N-1}{2}\right) & i=j \\ 0 & \text{else.} \end{cases} \quad \text{formula 28}$$

In the present embodiment of the invention, when the transmitted symbol includes three identical original partial data, the ICI estimating module 220 obtains an approximation of the estimated ICI $\vec{e}_{ici}'$ as:

$$\vec{e}_{ici}' \approx C \times (\vec{y}_3' - \vec{y}_1') \quad \text{formula 29.}$$

Next, the method proceeds to step 340, the ICI removing module 230 subtracts the received data by the estimated ICI so as to obtain an output symbol Dout'.

In the present embodiment of the invention, the ICI estimating module 220 is not limited to obtaining the estimated ICI with reference to the two copied partial data $\vec{y}_1'$ and $\vec{y}_3'$. The ICI estimating module 220 can also obtain another estimated ICI $\vec{e}_{ici}''$ according to the product of a constant array and the difference between other paired copied partial data (such as the difference between the copied partial data $\vec{y}_3'$ ad a copied partial data $\vec{y}_2'$ corresponding to the second received partial data). Meanwhile, the corresponding constant array is a diagonal array of a diagonal matrix C'''. The diagonal matrix is obtained from formula 1 by setting P as 1 and setting a as 2. The ICI estimating module 220 can obtain another preferred estimated ICI according to two estimated ICI $\vec{e}_{ici}$' and $\vec{e}_{ici}$''. Next, the ICI removing module 230 further subtracts the received symbol by the estimated ICI lastly obtained so as to obtain an output symbol.

In the present embodiment of the invention, if N is not a multiple of P, the method for removing ICI of the present embodiment of the invention further includes step 320a (not illustrated) prior to step 320. In step 320a, the ICI estimating module 230 performs interpolation to N received time domain sampling data of the received symbol so as to obtain R interpolated time domain sampling data, wherein (N+R) is a multiple of P. The ICI estimating module 220 equally divides the (N+R) time domain sampling data into P received partial data Dprt.

In the present embodiment of the invention, when the transmitter 100 modulates a frequency data Df to N sub-carriers as to obtain a transmitted data Dt, the transmitted data Dt includes N original time domain sampling data modulated to N sub-carriers. When frequency offset occurs between the frequency of the N sub-carriers and a reference frequency (such as frequency 0), a corresponding phase offset will occur to the N original time domain sampling data.

Under such circumstances, the method for removing ICI of the present embodiment of the invention further includes step 320b (not illustrated) prior to step 320. In step 320b, the ICI estimating module 220 performs frequency shift to the N received time domain sampling data so as to compensate the phase offset. After that, the method proceeds to step 320, the ICI estimating module copies at least two received partial data of the abovementioned compensated received symbol.

Figure 7:
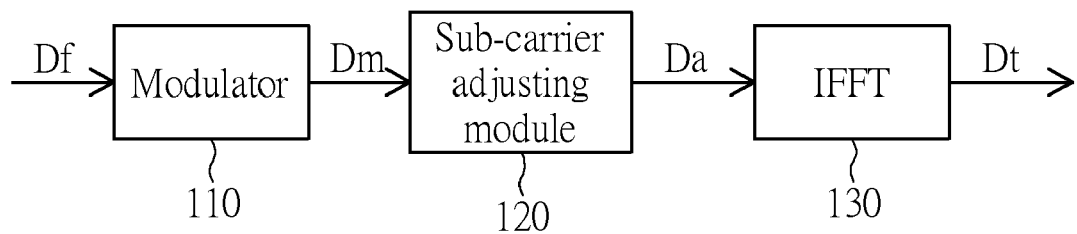
FIG. 7 shows a block diagram of a transmitter according to the first embodiment.

The operation of the transmitter 100 when identical original partial data are generated is elaborated below. FIG. 7 shows a block diagram of a transmitter 100 according to the first embodiment. Referring to FIG. 7, the transmitter 100 includes a modulator 110, a sub-carrier adjusting module 120 and an inverse fast Fourier transformer (IFFT) 130. The modulator 110 modulates a frequency data Df to be within a predetermined frequency band so as to obtain $$\frac{N}{P}$$

frequency sampling data Dm.

Next, the sub-carrier adjusting module 120 places the $$\frac{N}{P}$$

frequency sampling data Dm on the N sub-carriers within the predetermined frequency band at an interval of P points and places the null data to the sub-carrier free of any frequency sampling data so as to obtain a set of adjusted frequency data Da.

Next, the IFFT 130 performs inverse fast Fourier transform to the adjusted frequency data Da so as to obtain the transmitted symbol Dt. Thus, the transmitted symbol Dt includes P identical original partial data Dprt.

Figure 8:
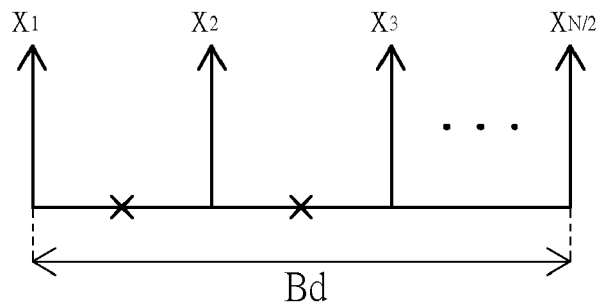
FIG. 8 shows an example of an adjusted frequency data.

FIG. 8 shows an example of an adjusted frequency data $x_1$ to $$x_{\frac{N}{2}}$$

place at an interval of 2 points when P is 2. As indicated in FIG. 8, the frequency sampling data $x_1$ to $$x_{\frac{N}{2}}$$

are placed at an interval and a null data is inserted into every two frequency data. Thus, following the inverse fast Fourier transform, the IFFT 130 will obtain a transmitted symbol Dt having two identical original partial data.

FIG. 8 is an example when P is exemplified as 2. However, P can be a positive integer larger than 1. Thus, the transmitter 100 can generate a transmitted symbol having P identical original partial data by increasing the frequency interval between the sub-carriers by P times. After that, after the receiver 200 receives the received symbol Dr via the wireless channel 300, the method for removing ICI of the present embodiment of the invention is then used to process the received symbol Dr.

As long as the transmitted symbol has repeated data, the method for removing ICI of the first embodiment can be used to remove ICI for the received symbol by way of simple operation such as addition, subtraction and multiplication of arrays.

Second Embodiment

Figure 9:
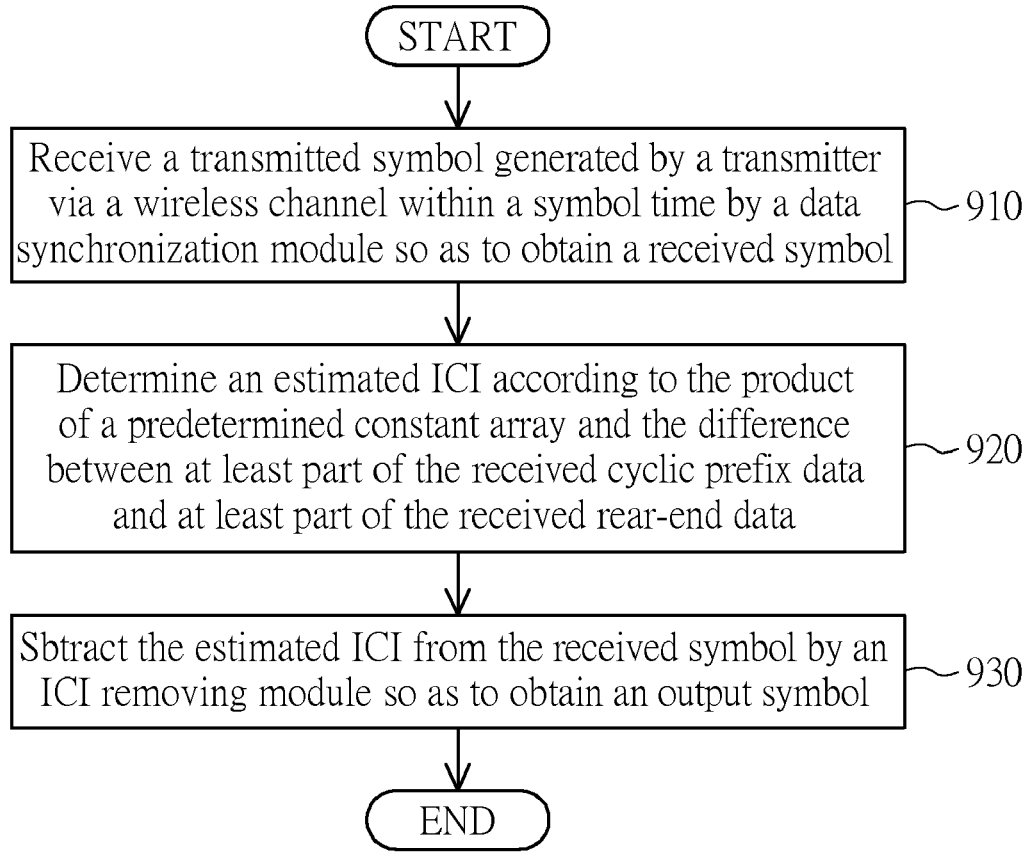
FIG. 9 shows a flowchart of a method for removing ICI according to a second embodiment.

In the second embodiment, the transmitted symbol Dt includes a cyclic prefix data (CP) and a data symbol. The operation of the receiver 200 and the transmitter 100 by using the characteristics of data repetition of the cyclic prefix of a transmitted symbol Dt is elaborated below. FIG. 9 shows a flowchart of a method for removing ICI according to the second embodiment.

Referring to FIG. 9. Firstly, the method begins at step 910, the data synchronization module 210 receives a transmitted symbol Dt generated by the transmitter 100 via a wireless channel within a symbol time 300 so as to obtain a received symbol Dr including an original data symbol Dn and a cyclic prefix data CP. The cyclic prefix data CP is the same with the rear-end data Db of the original data symbol Dn. That is, the rear-end data and the cyclic prefix data can be regarded as two identical original partial data Dprt of FIG. 2.

The received symbol Dr includes a received symbol and a received cyclic prefix data CP' corresponding to the data symbol Dn and the cyclic prefix data CP, respectively. A received rear-end data of the received symbol Dn' corresponds to the rear-end data symbol Dn.

Next, the method proceeds to step 920, the ICI estimating module 220 determines an estimated ICI Dici according to the product of a predetermined constant array C' and the difference between at least part of the received cyclic prefix data CP' and at least part of the received rear-end data.

After that, the method proceeds to step 930, the ICI removing module 230 subtracts the estimated ICI from the received symbol by so as to obtain an output symbol.

The front-end data of the received cyclic prefix data CP' of the transmitted symbol may be affected by multi-path delay spread of previous symbol. Therefore, in the second embodiment, the ICI estimating module 220 estimates the ICI according the part of the received cyclic prefix data not affected by the previous symbol and the part corresponding to the received rear-end data.

In the present embodiment of the invention, the received symbol Dn' includes N time domain sampling data, and the received cyclic prefix data CP' includes G time domain sampling data. Let the length of the wireless channel impulse response be L sampling units, wherein N≧G>L. On the part of the received cyclic prefix data CP', the first L time domain sampling data are interfered with by the previous symbol, but the last G−L time domain sampling data are not interfered with by the previous symbol.

Prior to step 910, the method for estimating ICI of the present embodiment of the invention further includes step 915 (not illustrated). In step 915, the ICI estimating module 220 retrieves the last (G−L) time domain sampling data from the received cyclic prefix data CP' so as to obtain a partial received cyclic prefix data CP". The ICI estimating module 220 also retrieves the last (G−L) time domain sampling data from the received symbol Dn' so as to obtain a partial received rear-end data Db". Mathematically, the partial received cyclic prefix data CP" and the partial received rear-end data Db" are obtained by multiplying the received cyclic prefix data CP' and the received rear-end data Db' by a window matrix $W_p$, respectively, wherein $$W_p = [0_{(G-L) \times L} I_{(G-L) \times (G-L)}] \qquad \text{formula 30.}$$

Then, the method proceeds to step 920, the ICI estimating module 220 obtains an estimated ICI $\vec{e}_{ici}^{cp}$ according to the product of a predetermined constant array and the difference between the partial received cyclic prefix data CP", and the partial received rear-end data Db", wherein $$\vec{e}_{ici}^{cp} \approx \frac{(N-1)}{N} \times M \times \begin{bmatrix} 0_{(N-G+L) \times 1} \\ \vec{y}(N-1-G+L:N-1) - \vec{y}_p(L:G-1) \end{bmatrix} \qquad \text{formula 31}$$

In formula 29, $\vec{y}_p$ (L:G−1) is the partial received cyclic prefix data CP", that is, a vector CP' formed by the L-th to the (G−1)-th time domain sampling data. $\vec{y}$ is a received symbol. $\vec{y}$(N−1−G+L:N−1) is a vector formed by a partial received rear-end data Db" time domain sampling data.

Figure 10:
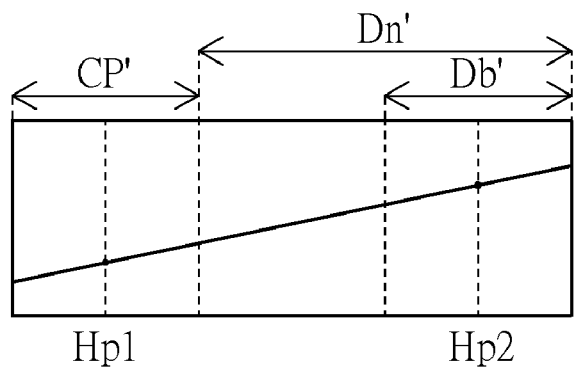
FIG. 10 shows an example of the change in the channel response of a transmitted symbol during transmission within a symbol time according to the second embodiment.

FIG. 10 shows an example of the change of wireless channel response of a transmitted symbol during transmission within a symbol time according to the second embodiment. The estimated ICI of formula 29 can be obtained from FIG. 10. In FIG. 10, $H_{p1}$ is the average ICI received by the received partial cyclic prefix data CP" and $H_{p2}$ is the average ICI received by the received partial rear-end data Db".

According to formula 10, $$\vec{e}_{ici} \approx M \times A \times \vec{x} = M_{p1} \times A \times \vec{x} + M_{p2} \times A \times \vec{x} \qquad \text{formula 32}$$

$$M_{p1} = \begin{cases} M(i,j) & i=j,\ 0 \le i,j \le N-G+L-1 \\ 0 & \text{else} \end{cases} \qquad \text{formula 33}$$

$$M_{p2} = \begin{cases} M(i,j) & i=j,\ N-G+L-1 \le 1,\ j \le N-1 \\ 0 & \text{else} \end{cases} \qquad \text{formula 34}$$

$$\vec{e}_{ici}^{cp} = M_{p2} \times A \times \vec{x}. \qquad \text{formula 35}$$

In formula 30, the ICI $\vec{e}_{ici}$ can be divided into two parts. $\vec{e}_{ici}^{cp}$ is the ICI corresponding to the partial received cyclic prefix data CP" and the partial received rear-end data Db", and is exactly the part to be removed in the method for removing ICI of the present embodiment of the invention. $M_{p1} \times A \times \vec{x}$ corresponds to the residual ICI of the received symbol Dr.

Like formula 15 and formula 16, the partial received cyclic prefix data $\vec{y}_p$ (L:G−1) and the partial received data symbol $\vec{y}$(N−1−G+L:N−1) can be approximated as:

$$\vec{y}_p(L:G-1) \approx W_p \times H_{p1} \vec{x}_p + W_p \times M_p \times A \times \vec{x}_p + W_p \times \vec{n}_p \qquad \text{formula 36}$$

$$\vec{y}(N-1-G+L:N-1) \approx W_p \times H_{p2} \vec{x}_p + W_p \times M_p \times A \times \vec{x}_p + W_p \times \vec{n}(N-1-G+L:N-1) \qquad \text{formula 37,}$$

wherein $\vec{x}_p$, the rear-end data of the transmitted symbol, is equal to the cyclic prefix data; $M_p$ is similar to the last (G−L) rows of the diagonal matrix obtained by expanding a linear approximation using $\vec{y}$(N−1−G+L:N−1) of formula 17 and formula 18 as the middle point; $\vec{n}_p$ is the Gaussian noise received by the received cyclic prefix data; $\vec{n}$ is the Gaussian noise received by the data symbol.

Thus, the method proceeds to step 122, the ICI estimating module 220 subtracts the partial received rear-end data by the partial received cyclic prefix data, and the difference is expressed as:

$$\vec{y}(N-1-G+L:N-1) - \vec{y}_p(L:G-1) = W_p \times (H_{p2} - H_{p1}) \vec{x}_p + W_p \times \vec{n}_p + W_p \times \vec{n}(N-1-G+L:N-1) \qquad \text{formula 38.}$$

Like formula 12, the method proceeds to step 920, the ICI estimating module 220 obtains the estimated ICI $\vec{e}_{ici}^{cp}$ by multiplying the difference between the partial received rear-end data and the partial received cyclic prefix data (that is, $\vec{y}$(N−1−G+L:N−1)−$\vec{y}_p$(L:G−1)) by a predetermined constant array.

Thus, the ICI for the repetition part of the cyclic prefix data can be estimated according to method for removing ICI of the present embodiment of the invention, and the amount of ICI to be removed is determined according to the change in the length of the cyclic prefix of the symbol.

Besides, as the middle point of the symbol time $T_s$ is close to the channel average and has a smaller time domain ICI, but the closer to the two ends of the symbol, the larger the time domain ICI is. Therefore, when using the cyclic prefix data CP to remove ICI, the symbol time for the receiving end can be advanced by $$\left\lfloor \frac{G-L}{2} \right\rfloor$$

point for allowing the part of the cyclic prefix data CP repeated with an ordinary data symbol to be located in two ends of the symbol so as to obtain a preferred ICI removing effect.

ICI has much to do with the moving speed of the receiver 200 and the channel state of the wireless channel 300. When the receiver 200 speeds, ICI also increase accordingly. Thus, the transmitter 100 of the present embodiment of the invention can design the length of the cyclic prefix data according to the moving speed, the channel state and the Gaussian noise intensity of the receiver so as to remove ICI appropriately.

Figure 11:
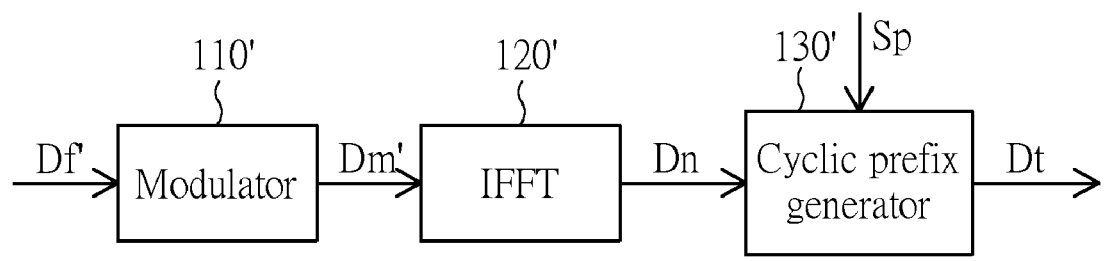
FIG. 11 shows a block diagram of a transmitter according to the second embodiment.

The operation of the transmitter 100 for generating the transmitted symbol of the present embodiment of the invention is elaborated below. FIG. 11 shows a block diagram of a transmitter 100 according to the second embodiment. In the present embodiment of the invention, the transmitter 100 includes a modulator 110', an IFFT 120' and a cyclic prefix generator 130'. Referring to FIG. 11, the modulator 110' modulates the frequency data Df' so as to obtain a modulated frequency symbol Dm'. The IFFT 120' performs inverse fast Fourier transform to the modulated frequency symbol Dm' so as to obtain the data symbol Dn.

The cyclic prefix generator 130' receives the data symbol Dn and generates appropriate cyclic prefix data according to the moving speed of the receiver 200, the channel state of the wireless channel 300 and the Gaussian noise intensity of the receiver. The transmitted symbol Dt includes the cyclic prefix data CP and the data symbol Dn.

The cyclic prefix generator 130' determines the length of the cyclic prefix data CP according to at least one of the moving speed of the receiver 200, the noise intensity of the wireless channel 300 and the channel state of the wireless channel. In FIG. 11, the cyclic prefix generator 130' determines the length of the cyclic prefix data CP according to the moving speed Sp of the receiver 200. In the present embodiment of the invention, if the moving speed Sp of the receiver 200 is higher than a threshold value, then the cyclic prefix generator 130' generates a cyclic prefix data having a first length, and if the moving speed Sp of the receiver 200 is not higher than the threshold value, then the cyclic prefix generator 130' generates a cyclic prefix data having a second length, wherein the first length is longer than the second length.

According to the above disclosure, when the receiver moves at a faster speed and causes more IC to the transmitted symbol, the transmitter will generate a longer cyclic prefix data CP so that the receiver can remove more ICI. If the receiver moves at a slower speed and causes less ICI to the transmitted symbol, the transmitter will generate shorter cyclic prefix data, hence increasing the transmission efficiency of the transmitted symbol. Therefore, the method for removing ICI of the present embodiment of the invention can achieve a balance between ICI removal and transmission efficiency.

In the first and the second embodiments, the wireless reception system 10 can be designed as a multi-input multi-output (MIMO) system. In the MIMO system, the transmitter 100 includes many transmission antennas, and the receiver 200 also includes many reception antennas. Under such environment, the method for removing ICI disclosed in the first and the second embodiments performs ICI removal on each reception antenna.

Figure 12:
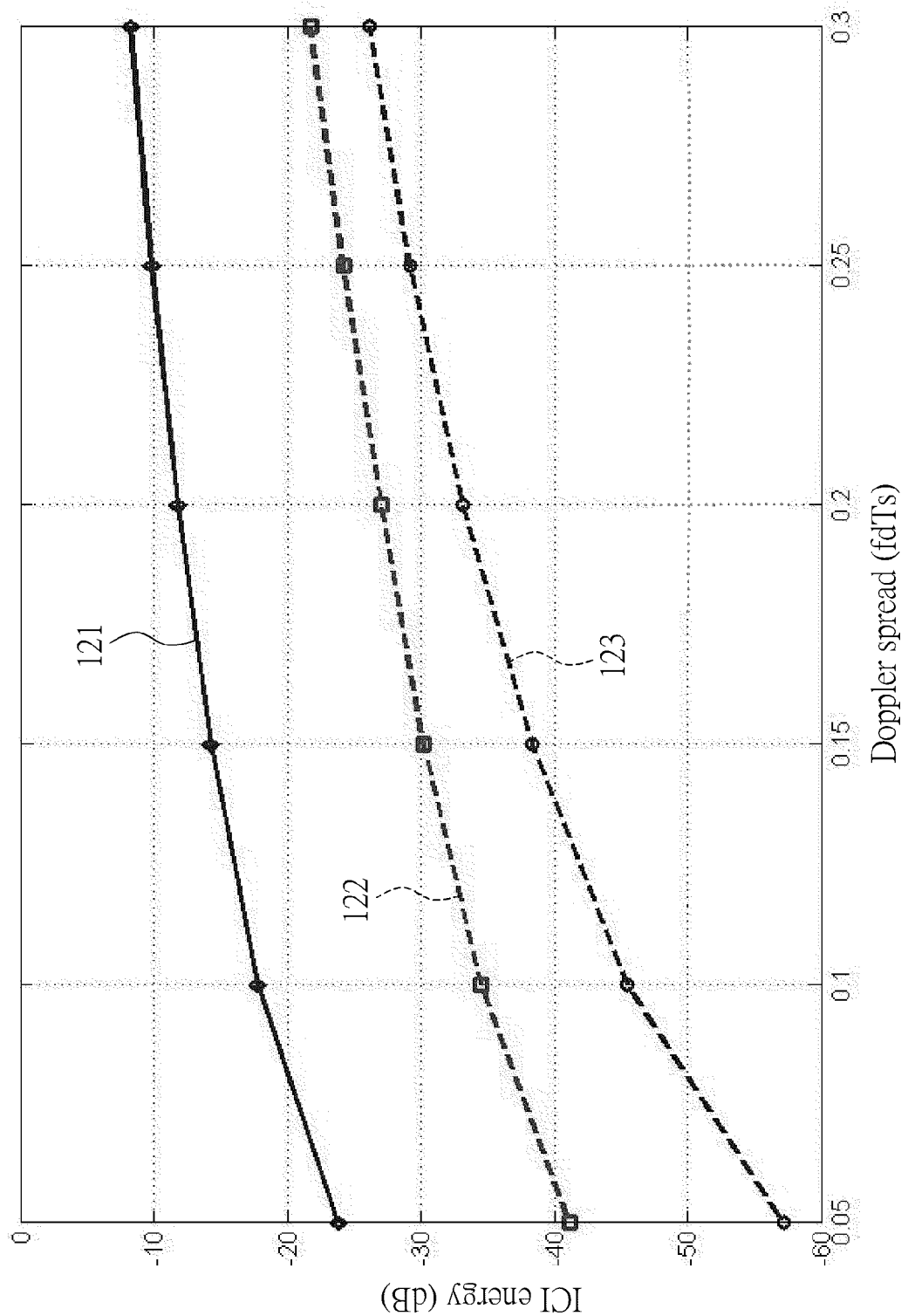
FIG. 12 shows a comparison curve of ICI energy vs. Doppler spread obtained when the transmitted symbol has repeated data and the method for removing ICI of the present embodiment of the invention, the conventional ICI self-cancellation method and not any particular method for removing ICI are used respectively.

The effect of the method for removing ICI of the first and the second embodiments is as follows. FIG. 12 shows a comparison curve of ICI energy vs. Doppler spread obtained when the transmitted symbol has repeated data and the method for removing ICI of the present embodiment of the invention, the conventional ICI self-cancellation method and not any particular method for removing ICI are used respectively.

In FIG. 12, the vertical axis of denotes the residual ICI energy $P_{ICI}$ received by the transmitted symbol, and the horizontal axis denotes the Doppler spread fdTs received by the receiver. The magnitude of Doppler spread fdTs corresponds to the moving speed of the receiver. For example, under the system environment that the carrier frequency is 2.5 GHz, the frequency bandwidth is 11.2 MHz, and the FFT is 1024, the moving speed of the receiver when the Doppler spread fdTs is 0.05 is approximately 235 km/h, and the moving speed of the receiver when the Doppler spread fdTs is 0.1 is approximately 470 km/h.

In FIG. 12, the curve 121 denotes the relationship of the ICI received by received symbol vs. the Doppler spread when no particular ICI removing method is used, the curve 122 denotes the relationship of the residual ICI vs. the Doppler spread when the ICI self-cancellation scheme is used, and the curve 123 denotes the relationship of the residual ICI vs. the Doppler spread when the method for removing ICI of the present embodiment of the invention is used.

As indicated in the curves 121 to 123, the larger the Doppler spread, the larger the ICI energy. In FIG. 12, when the Doppler spread fdTs is 0.05, the ICI self-cancellation method enables the ICI to decrease from −24 dB as in the curve 121 to −41 dB as in the curve 122. Thus, the ICI self-cancellation method decreases the ICI by approximately 17 dB.

When the Doppler spread fdTs is 0.05, the method for removing ICI of the present embodiment of the invention enables the ICI to decrease from −24 dB as in the curve 121 to −57 dB as in the curve 123. Thus, the method for removing ICI of the present embodiment of the invention decreases the ICI by 33 dB. Therefore, as indicated in FIG. 12, when the transmitted symbol has repeated data, the method for removing ICI of the present embodiment of the invention significantly decreases ICI and achieves a better effect than the conventional ICI self-cancellation scheme.

Figure 13:
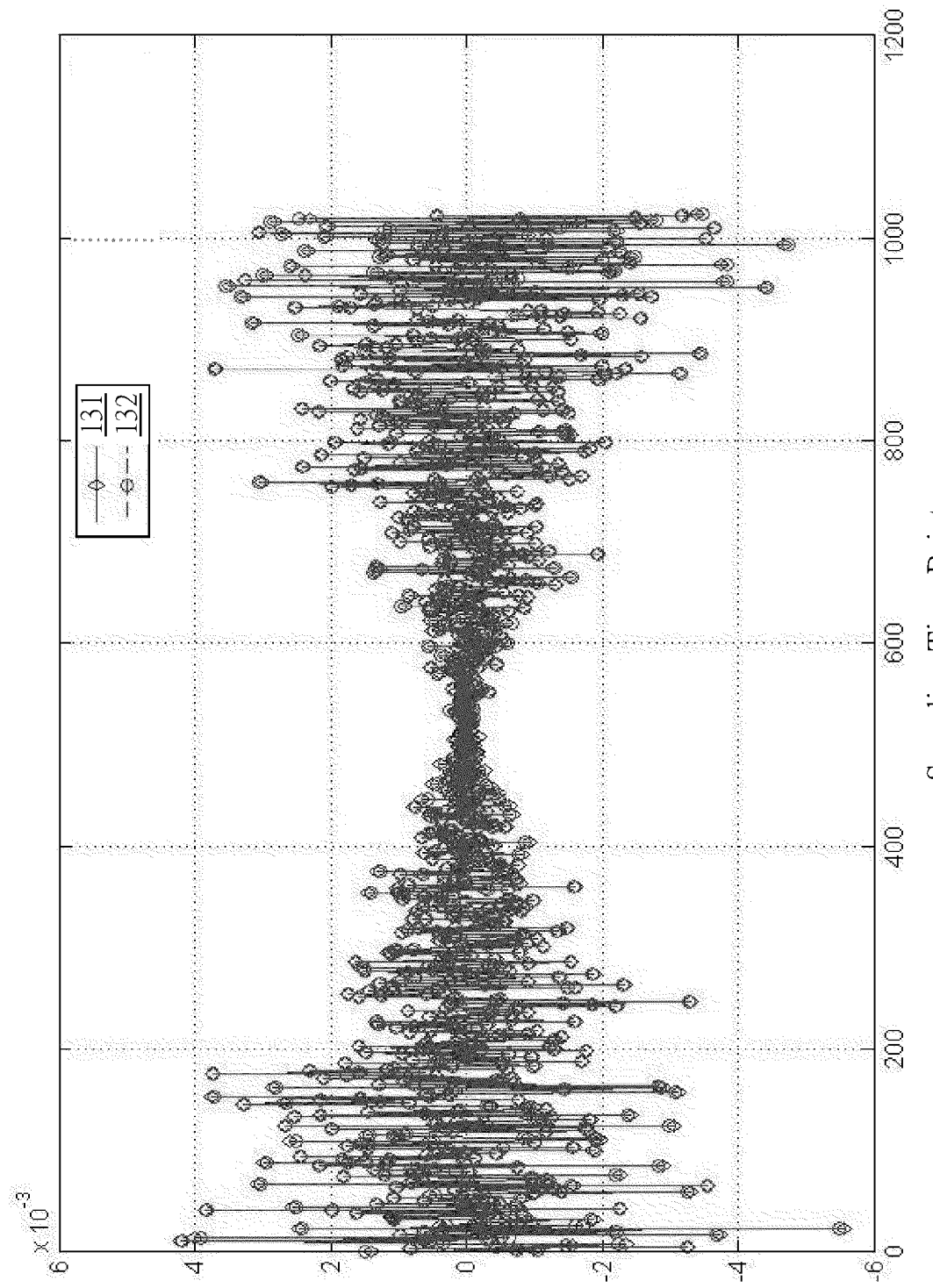
FIG. 13 shows the relationship between the real part of the ICI for a received symbol and the real part of the estimated ICI obtained according to the method for removing ICI according to the an embodiment of the invention when the transmitted symbol has repeated data.
Figure 14:
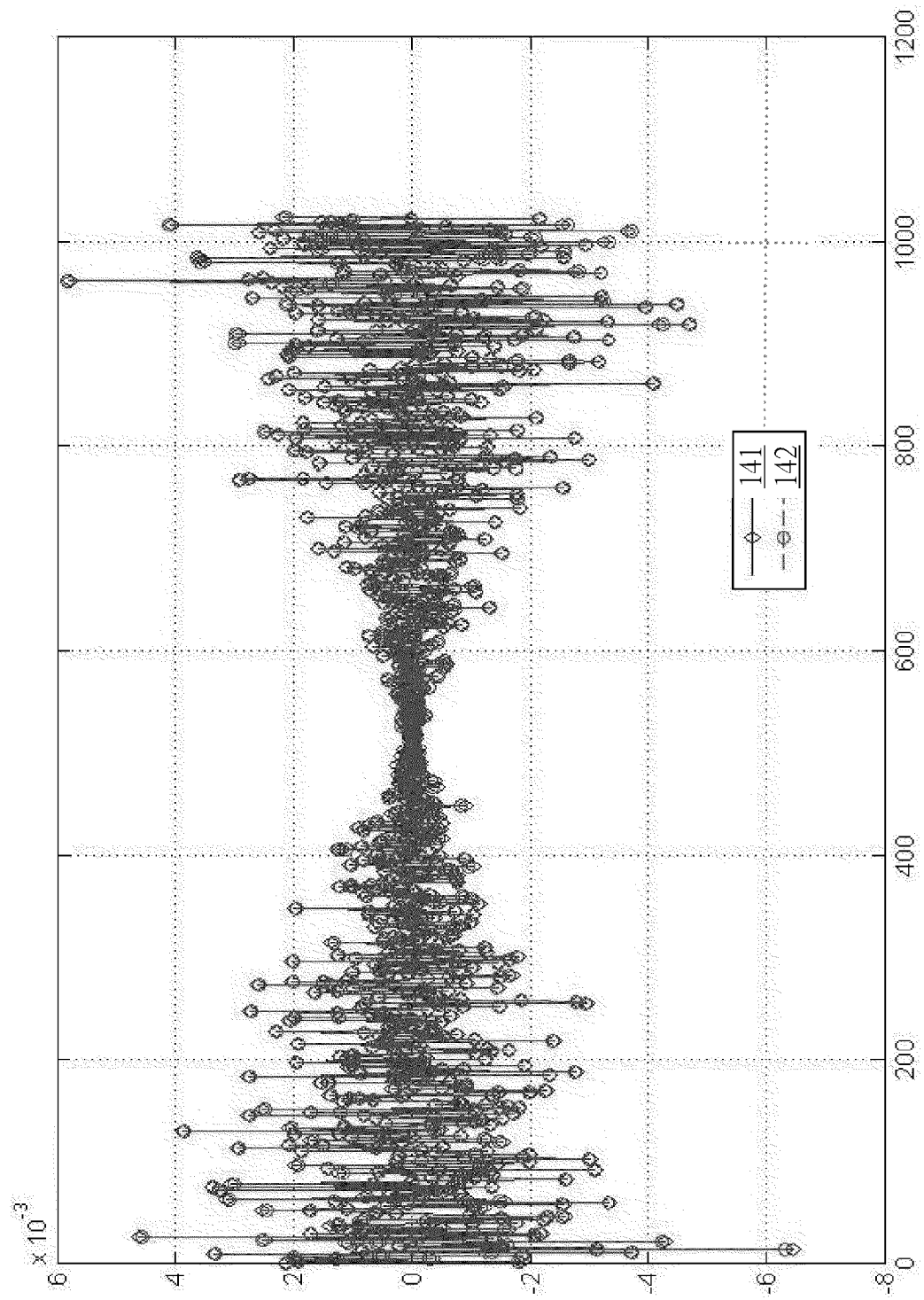
FIG. 14 shows the relationship between the image part of the ICI for a received symbol and the image part of the estimated ICI obtained according to the method for removing ICI according to the an embodiment of the invention when the transmitted symbol has repeated data.

FIG. 13 and FIG. 14 respectively show the real part and the image part of ICI for a received symbol and a result of estimated ICI when the transmitted symbol has repeated data.

In FIG. 13 and FIG. 14, the horizontal axes denote sampling time points, and the vertical axes respectively denote the real part of ICI and the magnitude of the image part. The curve 131 of FIG. 13 and the curve 141 of FIG. 14 respectively denote the real part and the image part of ICI for a received symbol. The curve 132 of FIG. 13 and the curve 142 of FIG. 14 respectively denote the real part and the image part of the estimated ICI obtained according to the method for removing ICI.

As illustrated in the drawing, the curves 131 is almost overlapped with the curve 132, and so is the curve 141 overlapped with the curve 142. Therefore, according to FIG. 13 and FIG. 14, when the transmitted symbol has repeated data, the method for removing ICI of the present embodiment of the invention can accurately estimate ICI.

Figure 15:
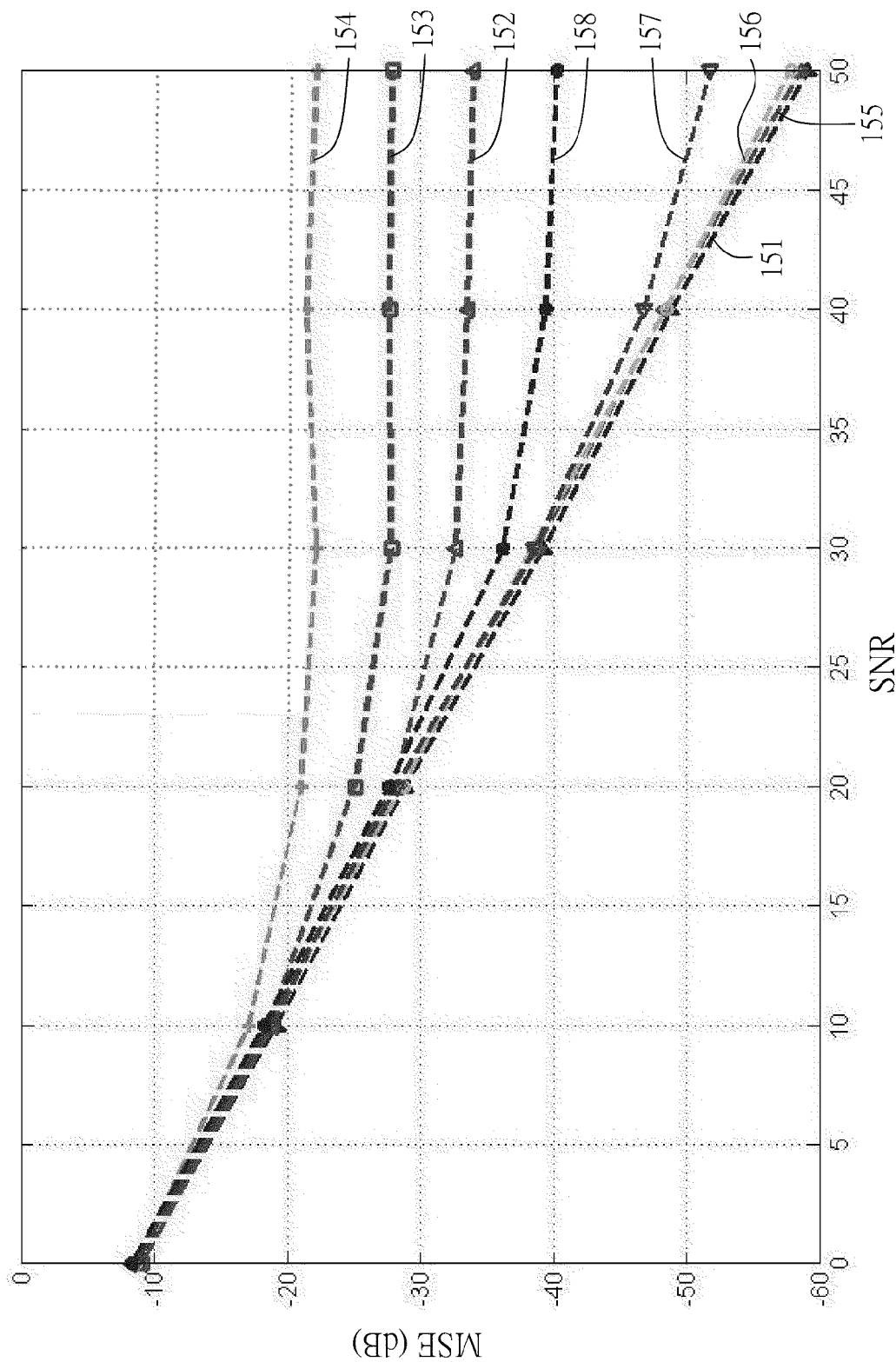
FIG. 15 shows an example of the MSE of a channel estimate when transmitting a preamble data according to 802.16e under different Doppler spreads and different Gaussian noise intensities.

FIG. 15 shows an example of the MSE of a channel estimate when transmitting a preamble data according to 802.16e under different Doppler spread and different Gaussian noise intensities. In FIG. 15, the vertical axis denotes mean square error (MSE), and the horizontal axis denotes signal-to-noise ratio (SNR). The curves 151 to 154 are corresponding relationship curves of SNR vs. MSE of channel estimate when not any method for removing ICI is used and the Doppler spread fdTs is 0, 0.05, 0.1 and 0.2, respectively. The curves 155 to 158 are corresponding relationship curves of SNR vs. MSE of channel estimate when the method for removing ICI of the present embodiment of the invention is used and the Doppler spread fdTs is 0, 0.05, 0.1 and 0.2, respectively.

The MSE of channel estimate is affected by ICI and the Gaussian noise intensity. According to the curve 153, when the Doppler spread fdTs is 0.1 and not any method for removing ICI is used, the MSE of channel estimate floors at −30 dB. Meanwhile, the MSE can not be reduced by increasing the SNR. According to the curve 157, provided the moving speed is the same but the method for removing ICI of the present embodiment of the invention is used, the MSE of channel estimate can be smaller than −50 dB. Thus, the method for removing ICI of the present embodiment of the invention largely improves the accuracy of channel estimate.

Figure 16:
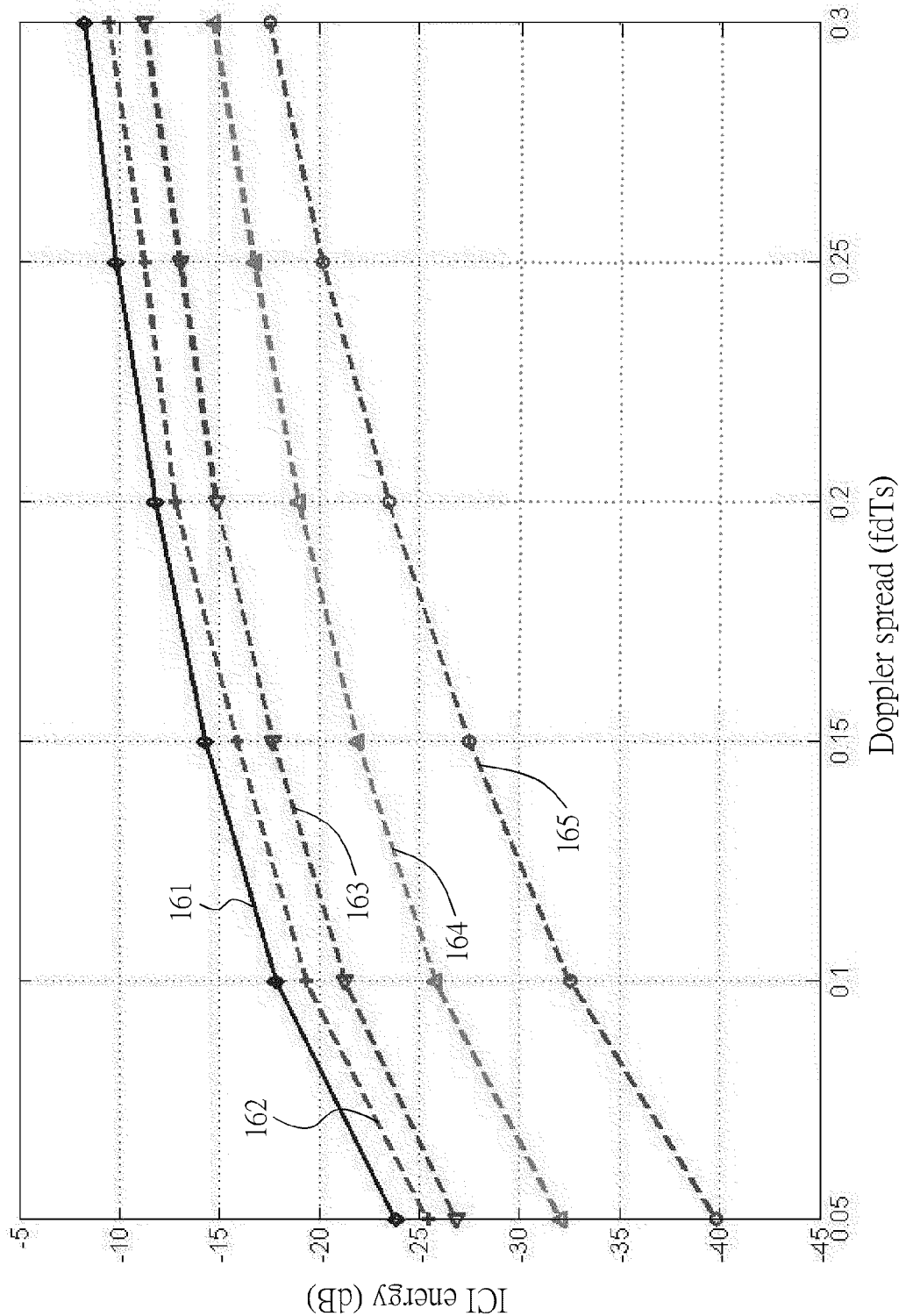
FIG. 16 shows an example of the relationship diagram of ICI for a received symbol vs. Doppler spread when the transmitted symbol is a data and its cyclic prefix data has different lengths.

FIG. 16 shows an example of the relationship diagram of ICI for a received symbol vs. the Doppler spread when the transmitted symbol is a data and the cyclic prefix data has different lengths. The curve 161 is a relationship curve of the Doppler spread vs. ICI when not any method for removing ICI is used. The curves 162 to 165 denote relationship curve of the Doppler spread vs. ICI when ICI removing method is used and the length of the cyclic prefix data is respectively ⅛, ¼, ½ and ¾ of the original data symbol.

According to the curve 161, when the Doppler spread fdTs is 0.05, and the ICI received by the received symbol is approximately −24 dB. According to the curve 162, when the length of the cyclic prefix data is ⅛ of the original data symbol, the ICI obtained is approximately −26 dB. Meanwhile, the method for removing ICI of the present embodiment of the invention removes ICI by 2 dB.

According to the curve 165, when the length of the cyclic prefix data is ¾ of the original data symbol, the ICI obtained by using the method for removing ICI of the present embodiment of the invention is approximately −40 dB. Meanwhile, the method for removing ICI of the present embodiment of the invention removes ICI by 16 dB. According to FIG. 16, the longer the cyclic prefix data, the more ICI is removed.

The above two embodiments are applied in the OFDM communication technology. In practical application, the method for removing ICI according to the embodiments of the invention embodiment is applicable to any transmitted symbol having repeated data to remove ICI for the received symbol.

The method for removing ICI according to the embodiments of the invention obtains the estimated ICI by way of simple operation of arrays such as subtraction and multiplication. As long as the transmitted symbol has repeated data, the method for removing ICI according to the embodiments of the invention can be used to remove ICI for the received symbol.

Compared with the conventional multi-level ICI reducing method which estimates the channel state and removes ICI by way of complicated operation, the method for removing ICI according to the embodiments of the invention has the advantage of simple implementation. Besides, the method for removing ICI according to the embodiments of the invention achieves better effect than the conventional ICI self-cancellation scheme. Therefore, the method for removing ICI according to the embodiments of the invention embodiment achieves excellent ICI removing effect when a low complicated operation is required.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for removing inter-carrier interference (ICI) for a received symbol, the method comprising:

receiving a transmitted symbol generated by a transmitter via a wireless channel within a symbol time so as to obtain the received symbol, wherein the transmitted symbol comprises P original partial data each comprising a plurality of original time domain sampling data, which are the same, and the received symbol comprises P received partial data corresponding to the original partial data, respectively;

copying at least two of the P received partial data on a time domain so as to obtain at least two copied partial data each comprising P copies of its corresponding received partial data, wherein P is a positive integer larger than 1;

determining an estimated ICI according to the product of a predetermined constant array and the difference between the copied partial data; and subtracting the received symbol by the estimated ICI so as to obtain an output symbol.

2. The method for removing ICI according to claim 1, wherein the received symbol comprises N received time domain sampling data, N is a positive integer, and in the copying step, the received symbol is multiplied by at least two of the P window matrixes to generate the at least two copied partial data, an i-th window matrix is an N×N matrix comprising P unit matrixes whose dimension is $$\frac{N}{P} \times \frac{N}{P},$$

the first column of each unit matrix is located in the $$\left((i-1) \times \frac{N}{P} + 1\right)\text{-}th$$

column of the i-th window matrix, other entries of the i-th window matrix are 0, i is a positive integer smaller than or equal to P.

3. The method for removing ICI according to claim 2, wherein the constant array is a diagonal array of a diagonal matrix C, and the entry in the i-th row and the j-th column of the diagonal matrix C is expressed as:

$$C(i,j) = \begin{cases} \frac{P}{(P-a) \times N}\left(i - \frac{N-1}{2}\right) & i = j \\ 0 & \text{else,} \end{cases}$$

wherein i and j are positive integers smaller than or equal to P, and a is a positive integer smaller than P.

4. The method for removing ICI according to claim 1, wherein the received symbol is a preamble data.

5. The method for removing ICI according to claim 1, wherein the transmitted symbol comprises N original time domain sampling data, the received symbol correspondingly comprises N received time domain sampling data, N is not a multiple of P, and prior to the copying step, the method further comprises:

performing interpolation to the N received time domain sampling data so as to obtain R interpolated time domain sampling data, wherein (N+R) is a multiple of P, and the (N+R) time domain sampling data are divided into the P received partial data.

6. The method for removing ICI according to claim 1, wherein the transmitted symbol comprises N original time domain sampling data already modulated to N sub-carriers, the received symbol correspondingly comprises N received time domain sampling data, there is a frequency offset existing between the frequency of the N sub-carriers and a reference frequency so that a corresponding phase offset occurs to the N original time domain sampling data, and prior to the copying step, the method further comprises:

performing frequency shift to the N received time domain sampling data to compensate the phase offset.

7. The method for removing ICI according to claim 1, wherein the transmitted symbol is outputted by one of the multi-antennas of a transmitter of a multiple input and multiple output (MIMO) system, and the received symbol is received by one of the multi-antennas of a receiver of the MIMO system.

8. The method for removing ICI according to claim 1, wherein the method for removing ICI is used in orthogonal frequency division multiplexing (OFDM) communication technology, and the transmitted symbol is a symbol.

9. A receiver for receiving a transmitted symbol generated by a transmitter via a wireless channel within a symbol time so as to obtain the received symbol and removing inter-carrier interference (ICI) for the received symbol, wherein the transmitted symbol comprises P original partial data each comprising a plurality of original time domain sampling data, which are the same, the received symbol comprises a plurality of received partial data corresponding to the original partial data, respectively, the receiver comprises:
- a data synchronization module for synchronizing the received symbol;
- an ICI estimating module for copying at least two of the P received partial data on a time domain so as to obtain the at least two copied partial data each comprising P copies of its corresponding received partial data and for determining an estimated ICI according to the product of a predetermined constant array and the difference between the copied partial data, wherein P is a positive integer larger than 1;
- an ICI removing module for subtracting the received symbol by the estimated ICI so as to obtain an output symbol;
- a fast Fourier transformer for converting the output symbol into a frequency domain; and
- a demodulator for demodulating the output symbol in the frequency domain.

10. The receiver according to claim 9, wherein the received symbol comprises N received time domain sampling data divided into the P received partial data, N is a positive integer, the ICI estimating module multiplies the received symbol by at least two of the P window matrixes to generate the at least two copied partial data, wherein an i-th window matrix is an N×N matrix comprising P unit matrixes whose dimension is $$\frac{N}{P} \times \frac{N}{P},$$

other entries are 0, i is a positive integer smaller than or equal to P.

11. The receiver according to claim 10, wherein the constant array is a diagonal array of a diagonal matrix C, and in the diagonal matrix C, the entry in the i-th row and the j-th column is expressed as $$C(i,j) = \begin{cases} \frac{P \times (N-1)}{(P-a) \times N}\left(i - \frac{N-1}{2}\right) / (N-1) & i = j \\ 0 & \text{else,} \end{cases}$$

wherein i and j are positive integers smaller than or equal to P, and a is a positive integer smaller than P.

12. The receiver according to claim 9, wherein the received symbol is a preamble data.

13. The receiver according to claim 9, wherein the transmitted symbol comprises N original time domain sampling data, the received symbol correspondingly comprises N received time domain sampling data, N is not a multiple of P, the ICI estimating module performs interpolation to the N received time domain sampling data so as to obtain R interpolated time domain sampling data, (N+R) is a multiple of P, and the ICI estimating module then equally divides the (N+R) time domain sampling data into the P received partial data.

14. The receiver according to claim 9, wherein the transmitted symbol comprises N original time domain sampling data already modulated to N sub-carriers, there is a frequency offset existing between the frequency of the N sub-carriers and a reference frequency so that a corresponding phase offset occurs to the N original time domain sampling data, the received symbol correspondingly comprises N received time domain sampling data, the ICI estimating module performs frequency shift to the N received time domain sampling data to compensate the phase offset, the ICI estimating module then copies the at least two received partial data of the compensated received symbol.

15. The receiver according to claim 9, wherein the transmitter and the receiver are respectively a transmitter and a receiver of a multiple input and multiple output (MIMO) system, one of the multi-antennas of the transmitter outputs the transmitted symbol, and one of the multi-antennas of the receiver receives the received symbol.

16. The receiver according to claim 9, wherein the receiver is used in communication technology, and the transmitted symbol is an orthogonal frequency division multiplexing (OFDM) symbol.

17. A wireless transmission system, comprising:
- a transmitter for generating and transmitting a transmitted symbol of a time domain, wherein the transmitted symbol comprises P original partial data each comprising a plurality of original time domain sampling data, which are the same; and
- a receiver for receiving the transmitted symbol via a wireless channel within a symbol time so as to obtain a received symbol, wherein the received symbol comprises P received partial data corresponding to the P original partial data, respectively, the receiver comprises:
  - a data synchronization module for synchronizing the received symbol;
  - an inter-carrier interference (ICI) estimating module for copying at least two of the P received partial data on a time domain so as to obtain at least two copied partial data each comprising P copies of its corresponding received partial data, wherein P is a positive integer larger than 1, and the ICI estimating module determines an estimated ICI according to the product of a predetermined constant array and the difference between the copied partial data;
  - an ICI removing module for subtracting the received symbol by the estimated ICI so as to obtain an output symbol;
  - a fast Fourier transformer for converting the output symbol into a frequency domain; and
  - a demodulator for demodulating the output symbol in the frequency domain.

18. The wireless transmission system according to claim 17, wherein the transmitted symbol comprises N original time domain sampling data, the received symbol correspondingly comprises N received time domain sampling data, N is not a multiple of P, the ICI estimating module performs interpolation to the N received time domain sampling data so as to obtain R interpolated time domain sampling data, (N+R) is a multiple of P, and the ICI estimating module then equally divides the (N+R) time domain sampling data into the P received partial data.

19. The wireless transmission system according to claim 17, wherein the transmitter modulates a frequency data to N sub-carriers so as to obtain the transmitted symbol, which comprises N original time domain sampling data, there is a frequency offset existing between the frequency of the N sub-carriers and a reference frequency so that a corresponding phase offset occurs to the N original time domain sampling data, the received symbol correspondingly comprises N received time domain sampling data, the ICI estimating module performs frequency shift to the N received time domain sampling data to compensate the phase offset, the ICI estimating module then copies the at least two received partial data of the compensated received symbol.

20. The wireless transmission system according to claim 17, wherein the transmitter further comprises:
   a modulator for modulating a frequency data to be within a predetermined frequency band so as to obtain $$\frac{N}{P}$$

frequency sampling data;
   a sub-carrier adjusting module for placing the $$\frac{N}{P}$$

frequency sampling data to the N sub-carriers within the predetermined frequency band at an interval of P points and also placing null data to the sub-carriers having not frequency sampling data so as to obtain a set of adjusted frequency data; and
   an inverse fast Fourier transformer for performing inverse fast Fourier transform to the adjusted frequency data so as to obtain the transmitted symbol.

21. The wireless reception system according to claim 17, wherein the wireless reception system is a multiple input and multiple output (MIMO) system, the transmitter comprises a plurality of transmission antennas, one of the transmission antennas transmits the transmitted symbol, and the receiver comprises a plurality of reception antennas, one of the reception antennas receives the received symbol.

22. The wireless reception system according to claim 17, wherein the wireless reception system is used in communication technology, and the transmitted symbol is an orthogonal frequency division multiplexing (OFDM) symbol.

23. A method for removing inter-carrier interference (ICI) for a received symbol, the method comprises:
   receiving a transmitted symbol generated by a transmitter via a wireless channel within a symbol time so as to obtain a received symbol comprising an original data symbol and a cyclic prefix data, wherein the cyclic prefix data is the same with the rear-end data of the original data symbol, the received symbol correspondingly comprises a received symbol and a received cyclic prefix data corresponding to the original data symbol and the cyclic prefix data, respectively, and a received rear-end data of the received data symbol corresponds to the rear-end data;
   determining an estimated inter-carrier interference (ICI) according to the product of a predetermined constant array and the difference between at least part of the received cyclic prefix data and at least part of the received rear-end data; and
   subtracting the estimated ICI from the received symbol so as to obtain an output symbol.

24. The method for removing ICI according to claim 23, wherein the length of the wireless channel impulse response is L sampling units, the received cyclic prefix data comprises G time domain sampling data, and prior to the estimating step, the method for removing ICI further comprises:
   retrieving the last (G−L) time domain sampling data from the received cyclic prefix data so as to obtain a partial received cyclic prefix data and retrieving the last (G−L) time domain sampling data from the received symbol so as to obtain a partial received rear-end data;
   wherein in the estimating step, an estimated ICI is determined according to the product of a predetermined constant array and the difference between the partial received cyclic prefix data and the partial received rear-end data.

25. The method for removing ICI according to claim 24, wherein in the step of retrieving the partial cyclic prefix data and the partial rear-end data, the received cyclic prefix data and the received rear-end data are respectively multiplied by a window matrix $W_p$ so as to obtain the partial cyclic prefix data and the partial rear-end data, $$W_p = [0_{(G-L) \times L} \, I_{(G-L) \times (G-L)}].$$

26. The method for removing ICI according to claim 25, wherein the received data symbol comprises N time domain sampling data, the constant array is a diagonal array of a diagonal matrix C, the entry in the i-th row and the j-th column of the matrix C is expressed as:

$$C(i, j) = \begin{cases} \left(i - \frac{N-1}{2}\right) \Big/ (N-1), & i = j \\ 0, & \text{else.} \end{cases}$$

27. The method for removing ICI according to claim 23, wherein the ICI removal is used in communication technology, and the transmitted symbol is an orthogonal frequency division multiplexing (OFDM) symbol.

28. A wireless transmission system, comprising:
   a transmitter for generating and transmitting a transmitted symbol of a time domain, wherein the transmitted symbol comprises an original data symbol and a cyclic prefix data, the cyclic prefix data is the same with an original rear-end data of the original data symbol, the transmitter comprising:
      a modulator for modulating a frequency data;
      a inverse fast Fourier transformer for converting the modulated frequency data into the original data symbol on a time domain; and
      a cyclic prefix generator for generating the cyclic prefix data identical to the original rear-end data; and
   a receiver for receiving the transmitted symbol via the wireless channel within a symbol time so as to obtain the a received symbol, wherein the received symbol correspondingly comprises a received symbol and a received cyclic prefix data respectively corresponding to the original data and the cyclic prefix data, a received rear-end data of the received data symbol corresponds to the rear-end data, wherein:
   the cyclic prefix generator further determines the length of the cyclic prefix data according to one of the moving speed of the receiver, the noise intensity of the wireless channel and the information of the channel state.

29. The wireless transmission system according to claim 28, wherein the receiver comprises:
   a data synchronization module for synchronizing the received symbol;
   an inter-carrier interference (ICI) estimating module for determining an estimated ICI according to the product of a predetermined constant array and the difference between a part of the received cyclic prefix data and a part of the received rear-end data;

an ICI removing module for subtracting the received symbol by the estimated ICI so as to obtain an output symbol;

a fast Fourier transformer for converting the output symbol into a frequency domain; and a demodulator for demodulating the output symbol in the frequency domain.

30. The wireless transmission system according to claim 29, wherein if the moving speed of the receiver is higher than a threshold value, then the cyclic prefix generator generates a cyclic prefix data having a first length, and if the moving speed of the receiver is not higher than the threshold value, then the cyclic prefix generator generates a cyclic prefix data having a second length, the first length is longer than the second length.

31. The wireless transmission system according to claim 28, wherein the wireless transmission system is used in communication technology and the transmitted symbol is an orthogonal frequency division multiplexing (OFDM) symbol.

32. A method for removing inter-carrier interference (ICI), comprising:

receiving a transmitted symbol generated by a transmitter via a wireless channel within a symbol time so as to obtain the received symbol, wherein the transmitted symbol comprises at least two identical original partial data, the received symbol comprises at least two received partial data corresponding to the at least two original partial data, respectively;

determining an estimated ICI according to the product of a constant array and the difference between the at least two received partial data; and subtracting the received symbol by the estimated ICI so as to obtain an output symbol.

33. The method for removing ICI according to claim 32, wherein the transmitted symbol comprises P original partial data, which are the same, the received symbol comprises P received partial data respectively corresponding to the original partial data, and prior to the estimating step, the method for removing ICI further comprises:

copying at least two of the P received partial data on a time domain so as to obtain the at least two copied partial data each comprising P copies of its corresponding received partial data, wherein P is a positive integer larger than 1;

wherein in the estimating step, an estimated ICI is determined according to the product of the constant array and the difference between the copied partial data.

34. The method for removing ICI according to claim 33, wherein the received symbol comprises N received time domain sampling data, N is a positive integer, in the copying step, the received symbol is multiplied by at least two of the P window matrixes to generate the at least two copied partial data, an i-th window matrix is an N×N matrix comprising P unit matrixes whose dimension is $$\frac{N}{P} \times \frac{N}{P},$$

all other entries are is 0, i is a positive integer smaller than or equal to P.

35. The method for removing ICI according to claim 34, wherein the constant array is an N×N diagonal array of a diagonal matrix C, and the entry in the i-th row and the j-th column of the diagonal matrix C is expressed as:

$$C(i,j) = \begin{cases} \frac{P \times (N-1)}{(P-a) \times N}\left(i - \frac{N-1}{2}\right) / (N-1) & i = j \\ 0 & \text{else,} \end{cases}$$

wherein i and j are positive integers smaller than or equal to P, and a is a positive integer smaller than P.

36. The method for removing ICI according to claim 33, wherein the received symbol is a preamble data.

37. The method for removing ICI according to claim 32, wherein the transmitted symbol comprises an original data symbol and a cyclic prefix data, the cyclic prefix data is the same with an original rear-end data of the original data, the two original partial data are respectively the cyclic prefix data and the original rear-end data, the received symbol comprises a received data symbol and a received cyclic prefix data respectively corresponding to the original data symbol and the cyclic prefix data, a received rear-end data of the received data symbol corresponds to the rear-end data, and the received cyclic prefix data and the received rear-end data are the two received partial data;

wherein in the estimating step, an estimated ICI is determined according to the product of a predetermined constant array and the difference between a partial received cyclic prefix data and at least part of the received rear-end data.

38. The method for removing ICI according to claim 37, wherein the length of the wireless channel impulse response is L sampling units, the received cyclic prefix data comprises G time domain sampling data, and prior to the estimating step, the method for removing ICI further comprises:

retrieving the last (G−L) time domain sampling data from the received cyclic prefix data so as to obtain the partial received cyclic prefix data and also retrieving the last (G−L) time domain sampling data from the received data symbol so as to obtain the partial received rear-end data;

wherein in the estimating step, an estimated ICI is determined according to product of a predetermined constant array and the difference between the partial received cyclic prefix data and the partial received rear-end data.

39. The method for removing ICI according to claim 38, wherein in the step of retrieving the partial received cyclic prefix data and the partial received rear-end data, the received cyclic prefix data and the received rear-end data are multiplied by a window matrix $W_p$ so as to obtain the partial cyclic prefix data and the partial rear-end data $$W_P = [0_{(G-L) \times L} \; I_{(G-L) \times (G-L)}].$$

40. The method for removing ICI according to claim 39, wherein the received data symbol comprises N time domain sampling data, the constant array is a diagonal array of a diagonal matrix C, and the entry in the i-th row and the j-th column of the diagonal matrix C is expressed as:

$$C(i,j) = \begin{cases} \left(i - \frac{N-1}{2}\right) / (N-1), & i = j \\ 0, & \text{else.} \end{cases}$$

41. The method for removing ICI according to claim 32, wherein the method for removing ICI is used in communication technology, and the transmitted symbol is an OFDM symbol.

* * * * *